US010034164B2

(12) United States Patent
Sakoda et al.

(10) Patent No.: US 10,034,164 B2
(45) Date of Patent: Jul. 24, 2018

(54) PROVIDING SERVICE INFORMATION BASED ON A PRIORITY THAT IS CHANGED ACCORDING TO STATUS OF A SERVICE

(71) Applicant: SONY CORPORATION, Tokyo (JP)

(72) Inventors: Kazuyuki Sakoda, Chiba (JP); Yoichiro Sako, Tokyo (JP); Takatoshi Nakamura, Kanagawa (JP); Michihiro Kobayashi, Tokyo (JP); Kazuhiro Watanabe, Tokyo (JP)

(73) Assignee: SONY CORPORATION, Tokyo (JP)

( * ) Notice: Subject to any disclaimer, the term of this patent is extended or adjusted under 35 U.S.C. 154(b) by 43 days.

(21) Appl. No.: 14/653,509

(22) PCT Filed: Oct. 25, 2013

(86) PCT No.: PCT/JP2013/006337
§ 371 (c)(1),
(2) Date: Jun. 18, 2015

(87) PCT Pub. No.: WO2014/103119
PCT Pub. Date: Jul. 3, 2014

(65) Prior Publication Data
US 2015/0312748 A1 Oct. 29, 2015

(30) Foreign Application Priority Data
Dec. 26, 2012 (JP) .................... 2012-282306

(51) Int. Cl.
*H04W 4/00* (2018.01)
*H04W 8/08* (2009.01)
(Continued)

(52) U.S. Cl.
CPC ............. *H04W 8/08* (2013.01); *H04W 48/08* (2013.01); *H04W 48/16* (2013.01); *H04W 84/18* (2013.01)

(58) Field of Classification Search
CPC ....... H04W 8/08; H04W 48/16; H04W 48/08; H04W 84/18
See application file for complete search history.

(56) References Cited

U.S. PATENT DOCUMENTS 9,268,386 B2 * 2/2016 Cheng .................. G06F 1/3203
2007/0195760 A1 8/2007 Rahman et al.
(Continued)

FOREIGN PATENT DOCUMENTS

CN 101540709 A 9/2009
CN 102577321 A 7/2012
(Continued)

OTHER PUBLICATIONS

Dipanjan Chakraborty et al, "Towards Distributed Service Discovery in Pervasive Computing Enviornments", vol. 5, No. 2, Feb. 2006, pp. 16, IEEE Transactions on Mobile Computing.
(Continued)

*Primary Examiner* — Afshawn M Towfighi
(74) *Attorney, Agent, or Firm* — Chip Law Group

(57) ABSTRACT

An information processing device includes circuitry configured to acquire service information for a service from a first information processing apparatus, change a priority of the service based on a status of the information processing apparatus or a status of the service, and provide the service information to a second information processing apparatus based on the priority.

21 Claims, 18 Drawing Sheets

(51) Int. Cl.
*H04W 48/08* (2009.01)
*H04W 48/16* (2009.01)
*H04W 84/18* (2009.01)

(56) References Cited

U.S. PATENT DOCUMENTS

2010/0202423 A1* 8/2010 Karaoguz .......... G06Q 30/0241
370/338
2011/0055326 A1* 3/2011 Michaelis ............. H04W 48/08
709/204

FOREIGN PATENT DOCUMENTS

| EP | 1542409 A | 6/2005 |
| EP | 1542409 A1 | 6/2005 |
| EP | 2104392 A | 9/2009 |
| JP | 2009-239385 A | 10/2009 |

OTHER PUBLICATIONS

Office Action for CN Patent Application No. 201380066777.1, dated Feb. 2, 2018, 07 pages of Office Action and 11 pages of English Translation.

* cited by examiner

| | 321 | 322 | 323 | 324 |
|---|---|---|---|---|
| | CONTENT | SERVICE | PRIORITY RANKING (INFORMATION) | OTHER INFORMATION |
| PRIORITY HIGH ↑ | CONTENT A | SERVICE A | ... | ... |
| | CONTENT B | SERVICE B | ... | ... |
| | CONTENT C | SERVICE C | ... | ... |
| | CONTENT D | SERVICE D | ... | ... |
| PRIORITY LOW | ⋮ | ⋮ | ⋮ | ⋮ |

| | 331 | 332 | 333 | 334 |
|---|---|---|---|---|
| | SERVICE | PRIORITY RANKING (INFORMATION) | COUNTER | OTHER INFORMATION |
| PRIORITY HIGH ↑ | SERVICE A | ... | ... | ... |
| | SERVICE B | ... | ... | ... |
| | SERVICE M | ... | ... | ... |
| | SERVICE C | ... | ... | ... |
| | SERVICE D | ... | ... | ... |
| | SERVICE N | ... | ... | ... |
| PRIORITY LOW | ⋮ | ⋮ | ⋮ | ⋮ |

FIG. 6

| | | |
|---|---|---|
| 163 | SERVICE TYPE | INFORMATION FOR IDENTIFYING CONTENT OF SERVICE (CONTENT DISTRIBUTION, OR THE LIKE). NUMBER OF TIMES INDICATING HOW MANY TIMES THE SERVICE DISCOVERY INFORMATION CAN BE TRANSMITTED NEXT TIME MAY BE INCLUDED. WIRELESS COMMUNICATION DEVICE THAT HAS RECEIVED SERVICE DISCOVERY INFORMATION CAN DETERMINE WHETHER OR NOT TO RECEIVE THE SERVICE SPECIFIED BY SERVICE TYPE, BASED ON SERVICE TYPE. |
| 164 | CONTENT ID | ID FOR SPECIFYING SERVICE. WIRELESS COMMUNICATION DEVICE THAT TRANSMITS OR RECEIVES THE SERVICE DISCOVERY INFORMATION MANAGES WHETHER IT HAS RECEIVED THE SERVICE SPECIFIED BY THE CONTENT ID, BASED ON INFORMATION OF CONTENT ID, AND GENERATES BILLING INFORMATION AND THE LIKE AS NECESSARY. |
| 165 | CONTENT ATTRIBUTE | INFORMATION INDICATING BIT CAPACITY REQUIRED TO PROVIDE A SERVICE, GROUP CAPABLE OF RECEIVING SERVICE, AUTHENTICATION METHOD REQUIRED FOR RECEIVING SERVICE, AND THE LIKE. WIRELESS COMMUNICATION DEVICE THAT HAS RECEIVED SERVICE DISCOVERY INFORMATION CAN DETERMINE BASED ON CONTENT ATTRIBUTE, WHETHER TO RECEIVE THE SERVICE CORRESPONDING THERETO, OR WHETHER OR NOT TO BE ABLE TO RECEIVE THE SERVICE. |
| 166 | RANKING INFORMATION | INFORMATION INDICATING WHETHER ACCESS FREQUENCY TO SERVICE (CONTENT) IS HIGH OR LOW. WIRELESS COMMUNICATION DEVICE THAT TRANSMITS SERVICE DISCOVERY INFORMATION CAN DETERMINE WHETHER TO NOTIFY SERVICE DISCOVERY INFORMATION TO NEXT WIRELESS COMMUNICATION DEVICE, OR WHICH LEVEL THE FREQUENCY OF NOTIFICATION IS SET, BASED ON RANKING INFORMATION. WIRELESS COMMUNICATION DEVICE THAT HAS RECEIVED SERVICE DISCOVERY INFORMATION CAN DETERMINE WHETHER OR NOT TO CACHE THE RECEIVED CONTENT, BASED ON RANKING INFORMATION. |
| 167 | CACHE RECOMMENDATION | INFORMATION INDICATING A DEGREE (RECOMMENDATION DEGREE) BY WHICH SERVICE IS RECOMMENDED TO BE CACHED TO ADJACENT WIRELESS COMMUNICATION DEVICE. IF IT IS DETERMINED THAT THE NUMBER OF ACCESSES TO SERVICE IS MANY AND SERVICE SHOULD BE PROVIDED EVEN TO OTHER WIRELESS COMMUNICATION DEVICES, WIRELESS COMMUNICATION DEVICE THAT TRANSMITS SERVICE DISCOVERY INFORMATION PERFORMS SETTING TO INCREASE THE RECOMMENDATION DEGREE. WIRELESS COMMUNICATION DEVICE THAT HAS RECEIVED SERVICE DISCOVERY INFORMATION CAN DETERMINE WHETHER TO RECEIVE AND CACHE CONTENT BASED ON CACHE RECOMMENDATION. |
| 168 | CLONE ORDER | INFORMATION INDICATING HOW MANY TIMES SERVICE (CONTENT) HAVE BEEN COPIED FROM THE ORIGINAL, OR HOW MANY TIMES OF COPY ARE ALLOWED NEXT TIME. WIRELESS COMMUNICATION DEVICE THAT HAS RECEIVED SERVICE DISCOVERY INFORMATION IS CONTROLLED SO AS NOT TO BE ABLE TO KEEP THE NUMBER OF TIMES OF COPIES MORE THAN THAT DEFINED BY CLONE ORDER. |
| 169 | SECONDARY DISTRIBUTION INFORMATION | INFORMATION INDICATING WHETHER WIRELESS COMMUNICATION DEVICE THAT HAS RECEIVED SERVICE DISCOVERY INFORMATION CACHES SERVICE (CONTENT) AND PERFORMS SECONDARY DISTRIBUTION. NECESSITIES OF CACHE OF SERVICE (CONTENT) AND THE SECONDARY DISTRIBUTION ARE CONTROLLED BASED ON SECONDARY DISTRIBUTION INFORMATION, WITH RESPECT TO WIRELESS COMMUNICATION DEVICE THAT HAS RECEIVED SERVICE DISCOVERY INFORMATION. |

PROVIDING SERVICE INFORMATION BASED ON A PRIORITY THAT IS CHANGED ACCORDING TO STATUS OF A SERVICE

TECHNICAL FIELD

The present technology relates to a wireless communication device, and more particularly, to a wireless communication device, a communication system, a control method of a wireless communication device, and a program encoded on a non-transitory computer readable medium for realizing the method in a computer, which transmit and receive data to and from other wireless communication devices using wireless communication.

BACKGROUND ART

In the related art, there are wireless communication technologies in which various pieces of data are exchanged using wireless communication. For example, communication schemes (for example, an ad-hoc communication or an ad-hoc network) in which neighboring wireless communication devices are independently interconnected with each other are proposed (for example, see PTL 1).

CITATION LIST

Patent Literature

PTL 1: JP 2009-239385A

SUMMARY

Technical Problem

According to the aforementioned related art, two wireless communication devices can exchange various pieces of data using wireless communication, without being connected through a wired line. Further, in such a network, each wireless communication device can communicate with neighboring wireless communication devices with each other, independently of a master station such as a control device. Further, in the ad-hoc network, if a new wireless communication device appears in the neighborhood, the new wireless communication device can freely join the network. Accordingly, the network coverage may increase, as the number of wireless communication devices increases in the neighborhood.

Further, each wireless communication device is independently interconnected with the neighboring wireless communication devices, and can also transmit information that is exchanged with other wireless communication devices in a bucket relay manner (so-called, multi-hop relay). Further, a network in which a multi-hop is performed is generally called a mesh network.

In this manner, in the ad-hoc network or the mesh network, a wireless communication device can independently communicate with neighboring wireless communication devices. However, if the network is enlarged due to connections with the neighboring wireless communication devices, an overhead for control is increased, and thus the network becomes inefficient.

The present technology is made in view of these circumstances, and it is desirable to efficiently perform wireless communication between a plurality of wireless communication devices.

Solution to Problem

The present invention broadly comprises a device, a method, and a non-transitory computer readable medium encoded with a program for executing the method on a processor. In one embodiment, the information processing device includes a circuitry configured to acquire service information for a service from a first information processing apparatus, change a priority of the service based on a status of the information processing apparatus or a status of the service, and provide the service information to a second information processing apparatus based on the priority.

Advantageous Effects of Invention

According to the present technology, it is possible to achieve an excellent effect that wireless communication performed between a plurality of wireless communication devices is effectively performed.

BRIEF DESCRIPTION OF DRAWINGS

FIG. 3 is a diagram schematically illustrating an example of management content of a content management table stored in a memory in the first embodiment of the present technology.

FIG. 6 is a diagram illustrating an example of a format of a beacon that each wireless communication device constituting the communication system transmits in the first embodiment of the present technology.

DESCRIPTION OF EMBODIMENTS

Hereinafter, embodiments for implementing the present technology (hereinafter, referred to as embodiments) will be described. The description will be given in the following order.

1. First embodiment (service information management control: An example of changing a priority (ranking information) of service information based on a use environment of a wireless communication device and a communication status of wireless communication)

<1. First Embodiment>

"Configuration Example of a Communication System"

Figure 1:
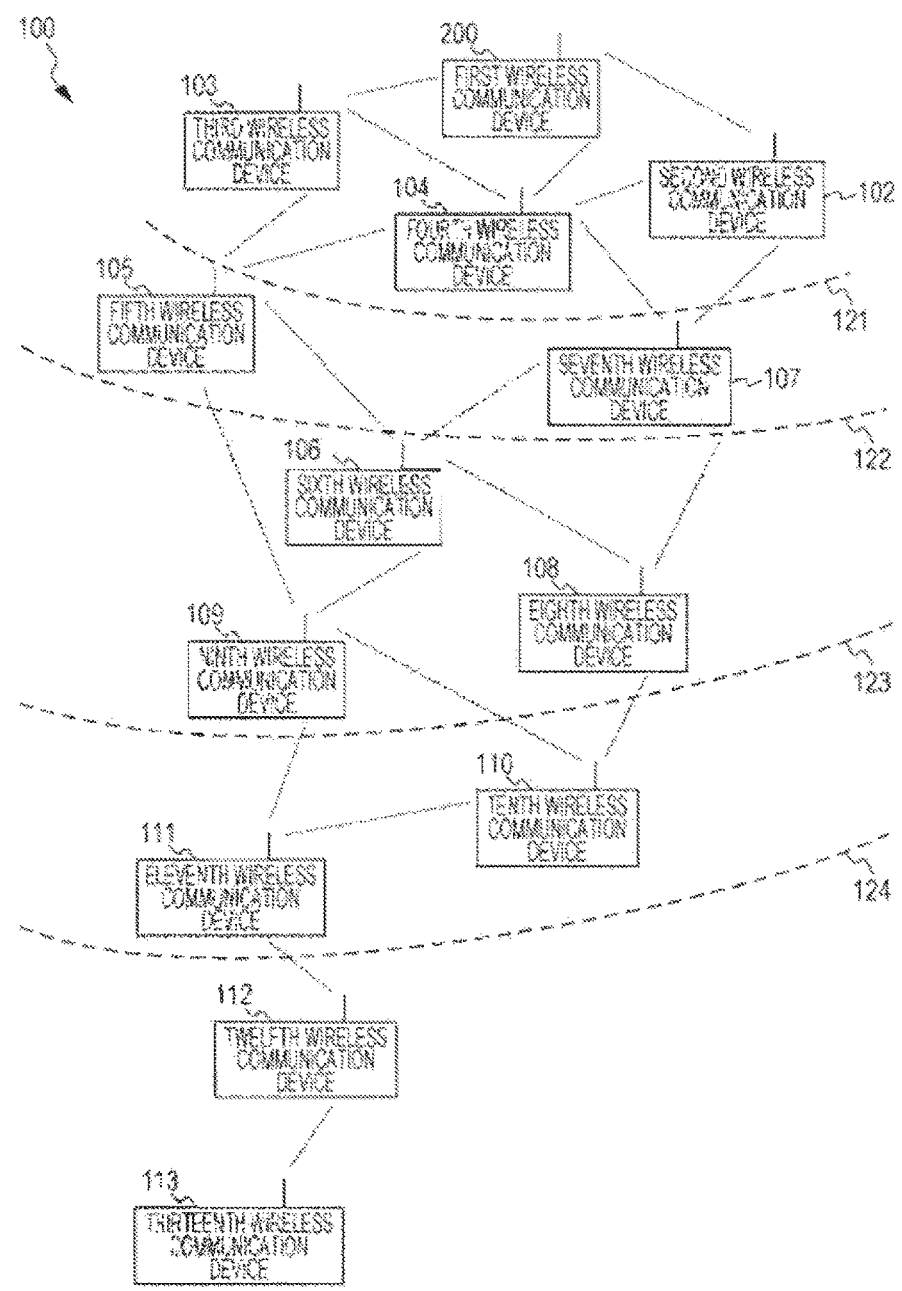
FIG. 1 is a diagram illustrating an example of a system configuration of a communication system in a first embodiment of the present technology.

FIG. 1 is a diagram illustrating an example of a system configuration of a communication system 100 in a first embodiment of the present technology.

The communication system 100 includes a plurality of wireless communication devices (a first wireless communication device 200, a second wireless communication device 102, a third wireless communication device 103, ... , and a thirteen wireless communication device 113). Each of wireless communication devices (devices) constituting the communication system 100 is, for example, a portable information processing device (for example, a smartphone, a mobile phone, and a tablet terminal) and a fixed information processing device (for example, a printer and a personal computer).

Here, an ad-hoc communication, an ad-hoc network, and the like are used as a communication scheme in which adjacent wireless communication devices are independently interconnected with each other. In such a network, each wireless communication device can perform a communication with the adjacent wireless communication device with each other, independently of a master station (for example, a control device). Therefore, in the embodiment of the present technology, the ad-hoc network is taken as an example of the communication scheme in which adjacent wireless communication devices are independently interconnected with each other.

In the ad-hoc network, if a new adjacent wireless communication device appears, the new wireless communication device can be independently joined to the network. For example, first, it is assumed that among respective wireless communication devices illustrated in FIG. 1, only the first wireless communication device 200, the second wireless communication device 102, the third wireless communication device 103, ... , and an eighth wireless communication device 108 are joined to the ad-hoc network. In this case, the ninth wireless communication device 109 to the thirteenth wireless communication device 113 are sequentially joined. In this case, coverage of the network can be increased as the number of respective wireless communication devices (adjacent wireless communication devices) increases. In other words, as the ninth wireless communication device 109 to thirteenth wireless communication device 113 are sequentially being added, it is possible to increase a coverage of the network.

Here, each wireless communication device can transmit information to be exchanged with other wireless communication devices in a bucket relay manner, as well as being independently interconnected with the adjacent wireless communication device.

For example, the first wireless communication device 200 can directly communicate with each of the second wireless communication device 102 to the fourth wireless communication device 104, but does not directly communicate with other wireless communication devices due to a reason that radio waves do not reach. FIG. 1 shows a range where the first wireless communication device 200 can directly communicate (a transfer range in a case where the first wireless communication device 200 is a reference) as a transfer range 121. In addition, the transfer range 121 corresponds to a transfer range in a case where the number of times of transmission (hop) is limited to one.

Even in a case where it is not possible to directly communicate in this manner, wireless communication devices (the second wireless communication device 102 to the fourth wireless communication device 104) capable of directly communicating with the first wireless communication device 200 can transmit data of the first wireless communication device 200 to the other wireless communication devices. Incidentally, by transmitting data in this manner, it becomes possible for the first wireless communication device 200 and wireless communication devices that do not directly communicate with the first wireless communication device 200 to perform an exchange of information. For example, the first wireless communication device 200 and the fifth wireless communication device 105 that do not directly communicate with the first wireless communication device 200 can perform an exchange of information with each other through the third wireless communication device 103 (or the fourth wireless communication device 104).

A method that performs date transfer (so-called, bucket relay) with each other in this manner and delivers information to a distant wireless communication device is called a multi-hop relay. Further, the network that performs multi-hop is commonly referred to as a mesh network.

Figure 2:
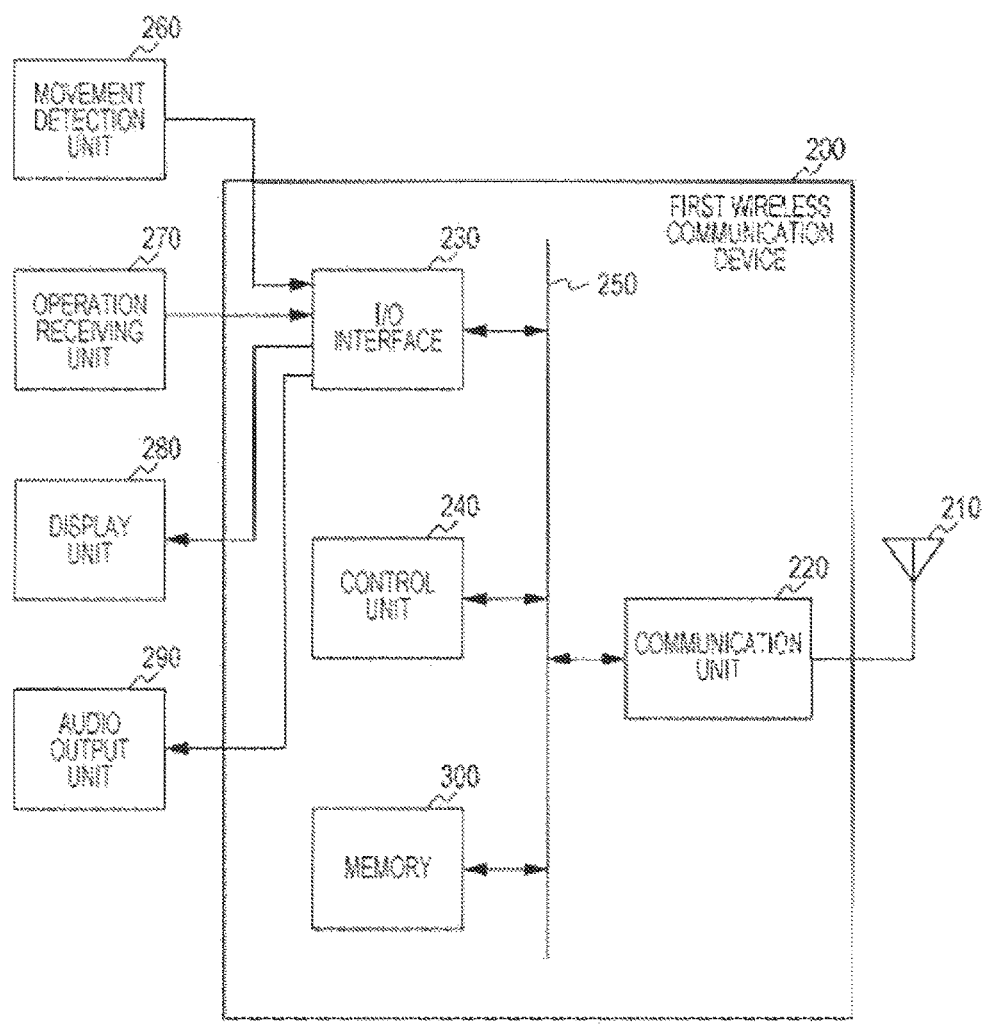
FIG. 2 is a block diagram illustrating an example of an internal configuration of a first wireless communication device in the first embodiment of the present technology.

In this manner, a configuration of a wireless communication device constituting an ad-hoc network and a mesh network is illustrated in FIG. 2.

Here, a multi-hop relay used in embodiments of the present technology will be described.

For example, a mesh network is configured as illustrated in FIG. 1, and a procedure until the first wireless communication device 200 performs a communication with the fifth wireless communication device 105 will be described.

The first wireless communication device 200 specifies which communication route is used (which wireless communication device is passed), before stating communication with the fifth wireless communication device 105. For example, the first wireless communication device 200 exchanges communication route selection information with each of adjacent wireless communication devices, based on a procedure according to a general communication route selection protocol.

For example, it is possible to use a procedure that is set by RFC 3626, Optimized Link State Routing Protocol (OLSR) standard, issued by IETF. Further, it is possible to use a procedure that is set by, for example, IEEE Standard, issued by IEEE, for Information Technology-Telecommunications and information exchange between systems-Local and metropolitan area networks-Specific requirements Part 11: Wireless LAN Medium Access Control (MAC) and Physical Layer (PHY) specifications Amendment 10: Mesh Networking (referred to as IEEE802.11s).

Based on these procedures, it is possible to detect that the first wireless communication device 200 can communicate with the fifth wireless communication device 105 without wasting wireless resources if passing through the third wireless communication device 103. For example, it is possible to detect that communication is possible without waste, based on the facts that the number of relay stations is minimum, the transmission delay is the smallest, and time to occupy a frequency channel for transmission is minimum.

The information used for the detection is held in the interior of each wireless communication device as communication route information, and is referred when searching for a wireless communication device to which packet should be transmitted next time in order for the packet to reach a final destination, in actual transmission and reception of the packet.

The first wireless communication device 200 acquires valid communication route information up to the fifth wireless communication device 105 according to the aforementioned procedure. Then, the first wireless communication device 200 transmits packets addressed to the fifth wireless communication device 105, to the third wireless communication device 103, based on the acquired communication route information. The third wireless communication device 103 that has received the packet transmits the received packet addressed to the fifth wireless communication device 105, to the fifth wireless communication device 105 based on communication route information that is held in the inside.

In addition, creation of the aforementioned communication route information may be performed with respect to all wireless communication devices connected to the mesh network. However, in a case where the number of wireless communication devices present in the interior of network is extremely large, an overhead doe to control packets and the like regarding the creation of the communication route information will be increased. Incidentally, in order to reduce the overhead due to control packets and the Like regarding the creation of the communication route information, for example, it is possible to limit the number of times when each packet is transmitted, as described above.

In addition, in FIG. 1, in a case where the first wireless communication device 200 is a reference, a transfer range in which the number of transmissions (hops) is limited to two is denoted by a transfer range 122, and a transfer range in which the number of transmissions (hops) is limited to three is denoted by the transfer range 123. Similarly, a transfer range in which the number of transmissions (hops) is limited to four is denoted by the transfer range 124.

Further, a mechanism that circulates a content, while communicating freely with peripheral devices using an ad-hoc network and a mesh network is considered. In order to realize such a mechanism, it is necessary to notify the peripheral devices of which content is held and can be provided by which wireless communication device.

Figure 5A:
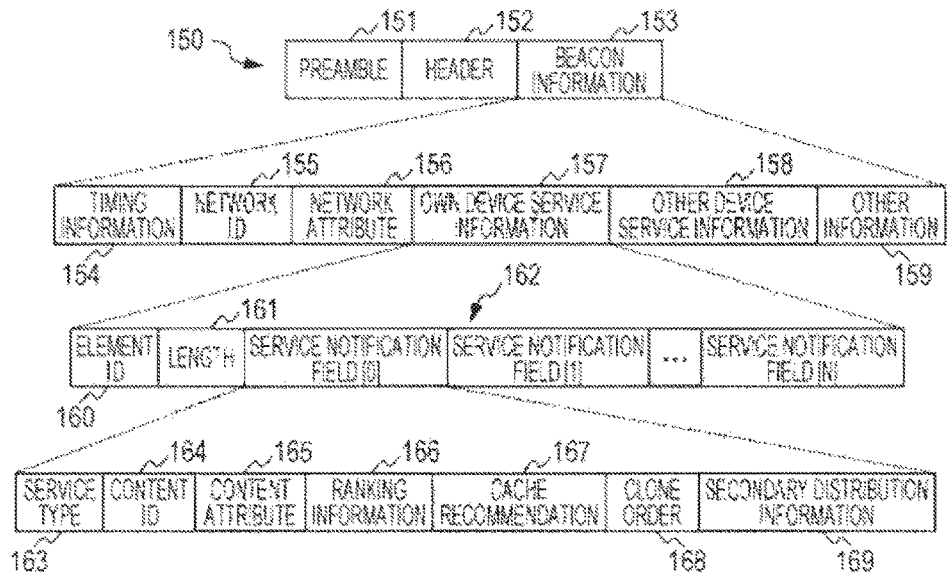
FIG. 5 is a diagram illustrating an example of a format of a beacon that each wireless communication device constituting the communication system transmits in the first embodiment of the present technology.
Figure 5B:
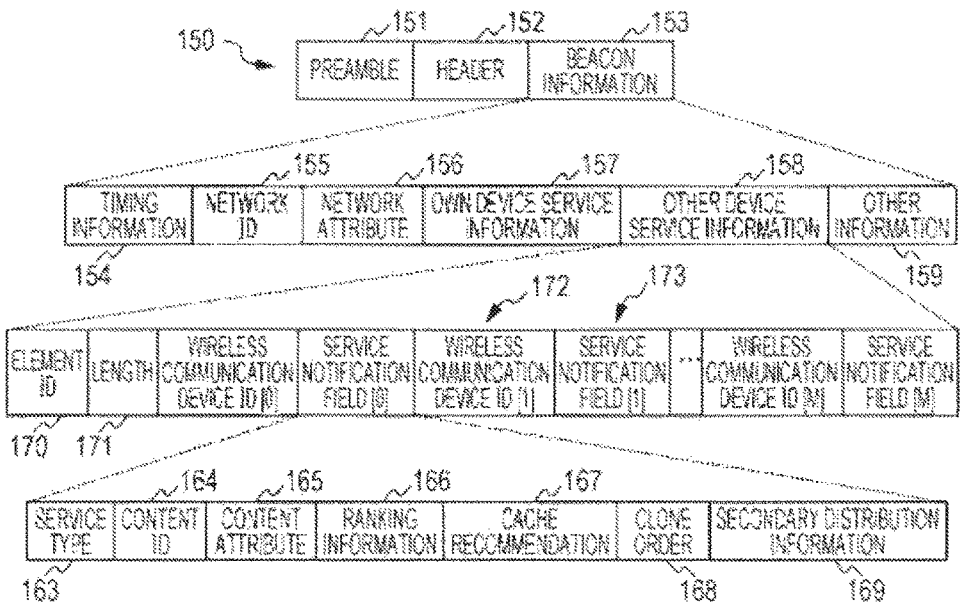

For example, as illustrated in FIG. 5A and FIG. 5B, by containing service discovery information (own device service information 157 and other device service information 158) in a beacon that is regularly transmitted by each wireless communication device, it is possible to notify the peripheral devices of services that can be provided by each wireless communication device. Further, each wireless communication device can discover wireless communication devices present in the neighborhood by searching the beacon. In this case, it is possible to detect which service the discovered wireless communication device provides.

Here, service discovery information is information to be used when discovering the service that can be provided by other wireless communication devices (information for notifying the service provided by each wireless communication device). For example, the own device service information 137 and other device service information 158, which are illustrated in FIG. 5A and FIG. 5B, correspond to the service discovery information.

However, it is not preferable to notify the peripheral devices of all services that a certain wireless communication device can provide, in terms of data amount. Further, for example, if the service provided by each wireless communication device has become diverse, it is assumed that service discovery information becomes gradually enormous. In this way, if the service discovery information that has become enormous is notified inexhaustibly, the overhead of the communication increases. Therefore, it is desirable to manage the service discovery information to be selected. Therefore, in the embodiment of the present technique, selection of the service discovery information is performed by giving a priority to each service. That is, in the embodiment of the present technique, only service discovery information regarding a service that satisfies a predetermined condition is notified to the peripheral devices.

"Configuration Example of a Wireless Communication Device"

FIG. 2 is a block diagram illustrating an example of an internal configuration of a first wireless communication device 200 in the first embodiment of the present technology. In addition, since internal configurations of other wireless communication devices are the same as that of the first wireless communication device 200, here, only the first wireless communication device 200 will be described, and the description of other wireless communication devices will be omitted.

The first wireless communication device 200 includes an antenna 210, a communication unit 220, an Input/Output (I/O) interface 230, a control unit 240, and a memory 300. Further, respective parts are connected through a bus 250.

The communication unit 220 is a module (for example, modem) that transmits and receives radio waves through an antenna 210. For example, the communication unit 220 can perform wireless communication by millimeter wave communication (60 GHz and the like), 5 GHz wireless Local Area Network (LAN), and Ultra Wide Band (UWB). Further, for example, the communication unit 220 can perform wireless communication by visible light communication and Near Field Communication (NFC).

For example, the communication unit 220 can transmit and receive service discovery information with other wireless communication devices present within a predetermined range, using wireless communication, based on a control of the control unit 240. Further, the communication unit 220 can transmit and receive data provided by each wireless communication device with other wireless communication devices present in the predetermined range, using wireless communication, based on the control of the control unit 240. In this case, the communication unit 220 can transmit data regarding a service provided from one wireless communication device to other wireless communication devices. Here, the predetermined range is a range relative to, for example, a position of the first wireless communication device 200, and means a range in which the communication unit 220 can transmit and receive data using wireless communication. Further, the other wireless communication devices present within the predetermined range is, for example, wireless communication devices present in the neighborhood of the first wireless communication device 200, and wireless communication devices that can transmit and receive data with the first wireless communication device 200 using wireless communication.

In addition, the communication unit 220 may perform wireless communication using radio waves (electromagnetic waves), and may perform wireless communication (for example, wireless communication performed using a magnetic field) using media other than radio waves.

Further, the communication unit 220 establishes a communication link with neighboring wireless communication devices and performs a communication with each other, and manages the number of neighboring wireless communication devices capable of communicating with the first wireless communication device 200 to hold information indicating the number of neighboring wireless communication devices capable of communicating (information regarding a communication possible number). Further, the communication unit 220 observes regularly or irregularly an utilization degree of the channels used for wireless communication and holds information (congestion level information) indicating congestion levels of communication lines around the first wireless communication device 200. Further, communication unit 220 observes a link quality (reception power, a transmittable data rate, or the like) between an adjacent wireless communication device which performs a wireless communication, and holds information indicating bandwidth at which the first wireless communication device 200 can perform wireless communication with the adjacent wireless communication device (communication status information). Then, the communication unit 220 supplies each piece of information to the control unit 240.

The I/O interface 230 is an interface with external devices such as sensors and actuators that operate in conjunction with the first radio communication device 200. FIG. 2 illustrates an example in which for example, external devices such as a movement detection unit 260, an operation receiving unit 270, a display unit 280 and an audio output unit 290 are connected to the I/O interface 230. Further, FIG. 2 illustrates an example in which the movement detection unit 260, the operation receiving unit 270, the display unit 280 and the audio output unit 290 are installed outside the first wireless communication device 200, but an entirety or a part of them may be built-in in the first wireless communication device 200.

The movement detection unit 260 detects movement of the first wireless communication device 200 by detecting an acceleration, a movement, an inclination, and the like of the first wireless communication device 200, and outputs movement information regarding the detected movement to the control unit 240 through the I/O interface 230. For example, the movement detection unit 260 holds movement information (log (or, real time information regarding the movement)) indicating whether the first wireless communication device 200 moves through a location, and supplies the information to the control unit 240. In addition, as the movement detection unit 260, for example, an acceleration sensor, a gyro sensor, and a Global Positioning System (GPS) can be used. For example, the movement detection unit 260 can calculate a moving distance (for example, a moving distance per unit time) of the first wireless communication device 200 using positional information (for example, latitude and longitude) that is detected by the GPS.

The operation receiving unit 270 is an operation receiving unit which receives an operation input performed by the user, and outputs operation information according to the received operation unit to the control unit 240 through the I/O interface 230. The operation receiving unit 270 is realized by, for example, a touch panel key board, or a mouse.

The display unit 280 is a display unit that displays various pieces of information (for example, a setting screen 500 illustrated in FIG. 17) based on control of the control unit 240. In addition, for example, a display panel such as an organic Electro Luminescence (EL) panel and a Liquid Crystal Display (LCD) panel can be used as the display unit 280. In addition, the operation receiving unit 270 and the display unit 280 can be formed integrally using a touch panel capable of receiving an operation input performed by the user approaching or contacting with the users fingers.

The audio output unit 290 is an audio output unit (for example, a speaker) that outputs various audio based on control of the control unit 240.

The control unit 240 controls each part of the first wireless communication device 200, based on a control program stored in the memory 300. For example, the control unit 240 performs signal processing of transmitted and received information. Further, the control unit 240 is realized by a Central. Processing Unit (CPU).

For example, the control unit 240 performs control for changing the ranking information (priority) contained in service discovery information to be transmitted to other wireless communication devices, based on at least one of a use environment of the first wireless communication device 200 and a communication status of the first wireless communication device 200. The ranking information is, for example, ranking information 166 illustrated in FIG. 5A, FIG. 5B and FIG. 6. Further, for example, the control unit 240 determines whether or not to register a service corresponding to the service discovery information, based on the ranking information (priority) contained in the service discovery information received from other wireless communication devices. For example, it is determined whether or not to register the service in the service management table 330 illustrated in FIG. 3A and FIG. 3B. Further, for example, the control unit 240 causes the changed ranking information (priority) to be contained in the service discovery information relating to the service registered in the service management table 330 and transmits the service discovery information to other wireless communication devices.

Further, for example, the control unit 240 determines whether or not to store the content in the memory 300, based on a priority of a content that provides a service. Further, for example, the control unit 240 sets a priority, based on ranking information of the content stored in the memory 300. Further, for example, the control unit 240 sets a priority of a registered service, based on ranking -information contained in the service discovery information.

The memory 300 is a memory that stores various pieces of information. For example, various pieces of information (for example, a control program) used by the first wireless communication device 200 for performing a desired operation is stored in the memory 300. Further, various contents such as music content and image content (for example, moving picture content, and still image content) are stored in die content storage area 310 (illustrated in FIGS. 8 and 9) of the memory 300.

Further, the content management table 320 (illustrated in FIG. 3A and FIG. 3B) for managing content and the service management table 330 (illustrated in FIG. 3A and FIG. 3B) for managing services are stored in the memory 300. In addition, the number of contents stored in the content storage area 310 of the memory 300 is managed by the content management table 320.

For example, in a case of transmitting data using wireless communication, the control unit 240 processes information that has been read from the memory 300, signals that have been input from the I/O interface 230, and the like, and generates a mass of data to be transmitted actually (transmission packet). Subsequently, the control unit 240 transmits the generated transmission packets to the communication unit 220. Further, after the communication unit 220 converts the transmission packet to the format of a communication scheme that actually transmits the transmission packet, the communication unit 220 transmits the converted transmission packet to the outside from the antenna 210.

Further, for example, in a case of receiving data using wireless communication, communication unit 220 extracts received packets from radio wave signals that have been received through the antenna 210, by signal processing performed by a receiver inside of the communication unit 220. Then, the control unit 240 interprets the received packets that are extracted. As the result of the interpretation, in a case where the data is determined to be data to be held, the control unit 240 writes the data to the memory 300. On the other hand, in a case where the data is determined to be data to be transmitted to the other wireless communication devices, the control unit 240 outputs as a transmission packet for transmission to the other wireless communication devices, the data to the communication unit 220. Further, in a case where the data is determined to be data to be transmitted to an external actuator, the control unit 240 outputs the data to an external device (for example, display unit 280) from the I/O interface 230.

For example, the control unit 240 can provide various contents stored in the memory 300 to other wireless communication devices using wireless communication. Further, the control unit 240 generates service discovery information based on the service management table 330 of the memory 300, and transmits the generated service discovery information to oilier wireless communication devices.

In addition, in a case where the first wireless communication device 200 is driven by a battery, the battery is embedded (built-in or mounted) in the first wireless communication device 200. In this case, the control unit 240 has a function of estimating a remaining battery amount so as to acquire the estimated remaining battery amount at any time.

"Management Content Example of a Content Management Table and a Service Management Table"

FIG. 3A and FIG. 3B are diagrams schematically illustrating examples of management contents of a content management table 320 and a service management table 330 that are stored in a memory 300 in the first embodiment of the present technology. FIG. 3A illustrates an example of management content of the content management table 320 and FIG. 3B illustrates an example of management content of the service management table 330.

The content management table 320 is a table for managing contents stored in the content storage area 310 (illustrated in FIGS. 8 and 9) of the memory 300. That is, a service that can be provided by the first wireless communication device 200 (service that can be provided by content stored in the content storage area 310) is registered in the content management table 320 and managed. Further, one piece of service information is registered for one service in the content management table 320. The service information corresponds to the service discovery information (own device service information 157 illustrated in FIG. 5A and FIG. 5B) one to one.

Specifically, content 321, a service 322, a priority 323, and other information items 324 are associated with each other and stored in the content management table 320. Further, respective services are arranged in a descending order of priority and managed in the content management table 320. In FIG. 3A, for ease of explanation, it is assumed that a service with a higher priority is positioned in an upper part, and the priority of a service becomes lower as proceeding to the lower part.

Information for specifying each of contents (for example, content ID 164 illustrated in FIG. 5A, FIG. 5B and FIG. 6) is stored in the content 321.

Information for specifying each of services (for example, service type 163 illustrated in FIG. 5A, FIG. 5B and FIG. 6) is stored in the service 322.

A priority (ranking information) set to each of services is stored in the priority 323. A priority setting method will be described with reference to FIG. 9 and the like.

Each piece of information regarding each service (for example, each piece of information illustrated in FIG. 6 (information other than the content ID 164 and the ranking information 166)) is stored in other information 324.

The service management table 330 is a table for managing services that can be provided by the first wireless communication device 200 or neighboring wireless communication devices. That is, the services that can be provided by the first wireless communication device 200 or the neighboring wireless communication devices are registered and managed in the service management table 330. Further, one piece of service information is registered for one service in the service management table 330. The service information corresponds to the service discovery information (own device service information 157 or other device service information 158 illustrated in FIG. 5A. and FIG. 5B) one to one.

Specifically, services 331, priorities 332, counters 333, and other information 334 are associated and stored in the service management table 330. Further, respective services are arranged in a descending order of priority and managed in the service management table 330. In FIG. 3B, for ease of explanation, it is assumed that a service with a higher priority is positioned in an upper part, and the priority of a service becomes lower towards the lower part.

Information for specifying each of services (for example, a service type 163 and content ID 164 illustrated in FIG. 5A, FIG. 5B and FIG. 6) is stored in the service 331.

A priority (ranking information) set in each of services is stored in the priority 332. A priority setting method will be described with reference to FIG. 8, FIG. 9 and the like.

The counter 333 first stores a value (counter) indicating that the priority is lowered. A method of changing the counter will be described in detail with reference to FIG. 15.

Each piece of information regarding each service (for example, each piece of information illustrated in FIG. 6 (information other than the content ID 164 and the ranking information 166)) is stored in other information 334.

For example, when notifying the service discovery information to the wireless communication devices present in the neighborhood, the control unit 240 picks up and transmits the service information by the number of items that can be posted in a descending order of priority among the service management table 330.

In addition, the own device service information 157 and the other device service information 158 may be managed separately as the service management table 330, or both of them may be managed collectively.

"Transmission Example of Service Discovery Information"

Figure 4:
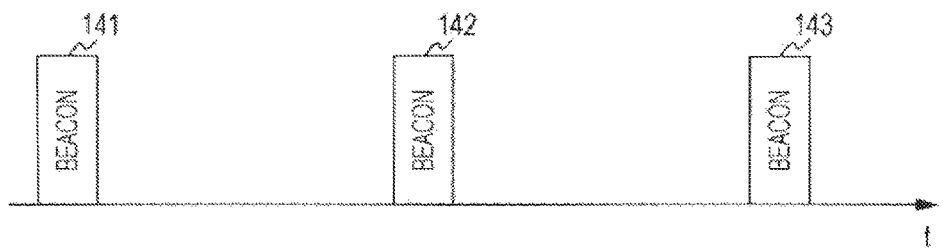
FIG. 4 is a diagram illustrating a transmission example in a case where each wireless communication device constituting the communication system transmits service discovery information in the first embodiment of the present technology.

FIG. 4 is a diagram illustrating a transmission example in a case where each wireless communication device constituting the communication system 100 transmits service discovery information in the first embodiment of the present technology.

FIG. 4 illustrates an example which transmits regularly (or irregularly) beacons (beacon signals) containing service discovery information. Further, FIG. 4 illustrates a transmission example of a beacon in a case of taking a horizontal axis as a time axis. That is, FIG. 4 schematically illustrates beacons 141 to 143 transmitted sequentially in chronological order.

In this manner, each of wireless communication devices constituting the communication system 100 notifies regularly (or irregularly) the service discovery information (contained in the beacon) to wireless communication devices in the neighborhood. In addition, a configuration example of the beacon will be described in detail with reference to FIG. 5A and FIG. 5B.

"Format Example of Service Discovery Information"

FIG. 5A, FIG. 5B and FIG. 6 are diagrams illustrating an example of a format of a beacon transmitted by each wireless communication device constituting the communication system 100, in the first embodiment of the present technology. In addition, FIG. 5A illustrates a format example of own device service information 157 contained in the beacon information 153, and FIG. 5B illustrates a format example of other device service information 158 contained in the beacon information 153. Further, FIG. 6 illustrates content example of a service notification field contained in the own device service information 157 and the other device service information 158.

The beacon 150 includes a preamble 151, a header 152, and beacon information 153.

The preamble 151 is information indicating the presence of a packet (beacon). That is, each of wireless communication devices constituting the communication system 100 can detect the presence of beacon by receiving the preamble 151.

The header 152 is disposed in a predetermined position of a packet and stores information regarding the packet (beacon) itself. For example, the header 152 stores each piece of information (information regarding the packet (beacon) itself) such as a transmission source, a transmission destination, and a size of a packet. That is, each of wireless communication devices constituting the communication system 100 decodes and interprets the header. By the interpretation, each of wireless communication devices constituting the communication system 100 can detect which wireless communication device transmits a signal to which wireless communication device, and farther detect which type the signal is (whether the signal is a beacon or not).

The beacon information 153 is information to be notified to each of wireless communication devices constituting the communication system 100. That is, each of wireless communication devices constituting the communication system 100 contains information to be notified to the other wireless communication devices in the beacon, and transmits the beacon.

Next, beacon information 153 will be described in detail.

The beacon information 153 includes timing information 154, a network ID 155, a network attribute 156, own device service information 157, other device service information 158, and other information 159.

The timing information 154 is timing information indicating a timing when the beacon containing the information is transmitted from a wireless communication device being a transmission source.

The network ID 155 is information indicating ID of a network configured by the wireless communication device being a transmission source.

The network attribute 156 is information indicating attribute of a network configured by the wireless communication device being a transmission source.

The own device service information 157 is information regarding a service provided by the wireless communication device being a transmission source (own device service information).

The other device service information 158 is information regarding a service provided by wireless communication devices present in the neighborhood of the wireless communication device being a transmission source (other device service information). As described above, the own device service information 157 and the other device service information 158 correspond to service discovery information.

The other information 159 is information other than the aforementioned information.

Next, the own device service information 157 and the other device service information 158 will be described.

As illustrated in FIG. 5A and FIG. 5B, the own device service information 157 is configured by information fields of an Element ID 160, a Length 161, and service notification fields [0] to [N] 162.

The Element ID 160 is an element ID indicating that own device service information is stored.

The Length 161 is a length indicating a length of an element of the own device service information.

The service notification fields [0] to [N] 162 are configured by one or a plurality of service notification fields (for example, N). One service notification field is disposed for each service provided by a corresponding wireless communication device. For example, three fields are disposed for the wireless communication device that provides three services.

The service notification fields [0] to [N] 162 store a service type 163, the content ID 164, the content attribute 165, the ranking information 166, the cache recommendation 167, the clone order 168, and the secondary distribution information 169. In addition, each piece of information will be described in detail with reference to FIG. 6.

As illustrated in FIG. 5B, other device service information 158 is configured by information fields such as an Element ID 170, a Length 171, wireless communication device IDs [0] to [M] 172, and service notification, fields [0] to [M] 173.

In addition, the other device service information 158 basically stores the same information as that of the own device service information 157, but additionally stores wireless communication device IDs [0] to [M] 172, differently therefrom. That is, the Element ID 170 and the Length 171 correspond to the Element ID 160 and the Length 161 which are illustrated in FIG. 5A. Further, the wireless communication device IDs [0] to [M] 172 and the service notification fields [0] to [M] 173 are disposed as a pair for each service provided by a wireless communication device.

The wireless communication device IDs [0] to [M] 172 are IDs for identifying corresponding wireless communication devices (for example, an adjacent wireless communication device). That is, the wireless communication devices IDs [0] to [M] 172 are information indicating which wireless communication device provides a service notification field as a pair.

The service notification fields [0] to [M] 173 are configured by one or a plurality of service notification fields (for example, M). In addition, the service notification fields [0] to [M] 173 are the same as the service notification fields [0] to [N] 162 illustrated in FIG. 5A except for storing information regarding other wireless communication devices (that is, wireless communication devices other than wireless communication devices that send beacons).

That is, a combination of the wireless communication device IDs [0] to [M] 172 and the service notification fields [0] to [M] 173 (that is, M combinations) exist for the number of services to be notified to wireless communication devices that send beacons.

Subsequently, service notification fields will be described with reference to FIG. 6.

The service type 163 is information for identifying contents of services (content distribution, and the like). Further, the service type 163 may include information indicating how many times the service discovery information can be transmitted next time (limit information for limiting the number of transmissions). By containing the limit information, it is possible to prevent the service discovery information regarding the service from being transmitted beyond the number of times. Further, the wireless communication device that has received service discovery information can determine whether or not to receive the service specified by the service type 163, based on the information of the service type 163.

The content ID 164 is an ID for specifying services. The wireless communication device that transmits and receives the service discovery information manages that it has received the service specified by the content ID 164, based on the information of the content ID 164, and generates billing information and the like as necessary.

The content attribute 163 is information indicating a bit capacity necessary to provide the service, a group capable of receiving the service, an authentication method necessary for receiving the service, and the like. For example, here, the group capable of receiving the service may be friends of the user carrying the wireless communication device that provides a service (wireless communication devices that the friends carry). In this case, it is possible to determine whether the wireless communication device belongs to the group, using the authentication method for identifying their friends. Further, based on the information of the content attribute 165, the wireless communication device that has received the service discovery information can determine whether or not to receive the service corresponding thereto, and whether or not to be able to receive the service.

The ranking information 166 is information indicating an evaluation of a service (content) (for example, whether the number of accesses to a service (content) is high or low). The wireless communication device that transmits service discovery information can determine, based on information of the ranking information 166, whether or not to notify the service discovery information to a next wireless communication device, or which level the number of notifications is set. The wireless communication device that has received the service discovery information can determine whether or not to cache the received content, based on information of the ranking information 166. For example, it is preferable to set the ranking information 166 in order to notify and receive the service of a high ranking.

The cache recommendation 167 is information indicating a degree by which the service is recommended to be cached to an adjacent wireless communication device (recommendation degree). If the number of accesses to the service is many and it is determined that the service should be provided even to other wireless communication devices, the wireless communication device that transmits the service discovery information performs setting to increase the recommendation degree. Further, the wireless communication device that receives the service discovery information can determine whether or not to receive and cache the content based on information of the cache recommendation 167.

The clone order 168 is information indicating how many times services (contents) have been copied from the original, or how many times copy is allowed next time. The wireless communication device that has received the service discovery information is controlled so as not to be able to keep a copy of the number of times more than that defined by the clone order 168.

The secondary distribution information 169 is information indicating whether the wireless communication device that has received the service discovery information may cache a service (content) and perform secondary distribution. The cache of a service (content) and the necessity of the secondary distribution are controlled based on the information of the secondary distribution information 169, with respect to the wireless communication device that has received the service discovery information.

For example, if the first wireless communication device 200 illustrated in FIG. 1 transmits a beacon in a broadcast, neighboring wireless communication devices (the second wireless communication device 102 to fourth wireless communication device 104) receive the beacon. Then, the second wireless communication device 102 to fourth wireless communication device 104 can detect that the beacon is transmitted from the first wireless communication device 200, based on a header of the received beacon. Further, the second wireless communication device 102 to fourth wireless communication device 104 confirm the content of the beacon information 153 contained in the received beacon, thereby noticing a service and the like that can be provided by the first wireless communication device 200.

For example, it is assumed a case where the second wireless communication device 102 to fourth wireless communication device 104 receive beacons 150 transmitted from the first wireless communication device 200. In this case, the second wireless communication device 102 to fourth wireless communication device 104 can detect that the first wireless communication device 200, the transmission source, forms a network in the neighborhood, based on a network attribute 156 contained in the received beacon 150. Further, an attribute of the network is specified by the network attribute 156.

Further, the second wireless communication device 102 to fourth wireless communication device 104 can acquire information regarding various services that can be received through the first wireless communication device 200, based on a service notification field 162 contained in the received beacon 150.

Further, when receiving the service discovery information from the first wireless communication device 200, the second wireless communication device 102 to fourth wireless communication device 104 themselves operate as relay stations for a multi-hop relay. Thus, the second wireless communication device 102 to fourth wireless communication device 104 can notify which service the first wireless communication device 200 can provide to a relay destination. That is, the service discovery information (own device service information 157 and other device service information 158) transmitted by the second wireless communication device 102 to the fourth wireless communication device 104 includes the service partially provided by the first wireless communication device 200. In addition, the information containing the service provided by the first wireless communication device 200 is other device service information 158.

By repeating the transmission and reception of the service discovery information in this way, it is possible to provide the service discovery information of the first wireless communication device 200 to every location in the network. That is, by containing the service discovery information in the beacon to be transmitted regularly, each wireless communication device may notify the wireless communication devices in the neighborhood of the service that can be provided. Further, each wireless communication device can also discover wireless communication devices present in the neighborhood by receiving a beacon, and detect at the same time which services are provided by the discovered wireless communication devices.

However, as described above, by limiting the number of transmissions of packets, it is possible to limit communication counterparts to which the first wireless communication device 200 can be connected. Thus, by limiting the number of transmissions, it is possible to adjust the extent, to which the service discovery information of the first wireless communication device 200 is transmitted. Thus, it is possible to reduce an overhead.

"File Configuration Example of a Content"

Figure 7:
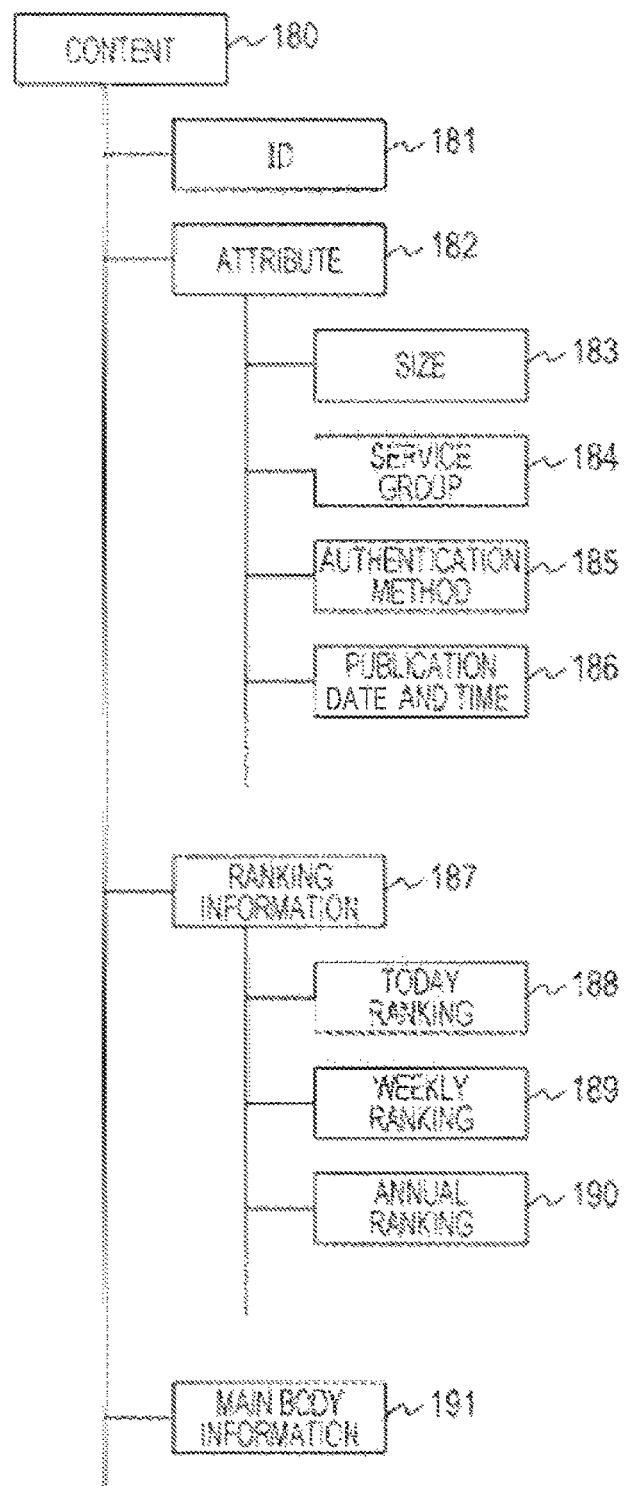
FIG. 7 is a diagram illustrating an example of a file configuration of a content transmitted and received by each wireless communication device in the first embodiment of the present technology.

FIG. 7 is a diagram illustrating an example of a file configuration of a content transmitted and received by each wireless communication device, in the first embodiment of the present technology.

Various pieces of data (supplementary information) other than main body information 191 are added to the content 180. For example, ID (identifier) 181, an attribute 182, and ranking information 187 are added to the content 180.

The ID 181 is an ID for fixing the content 180.

The attribute 182 is a parameter group indicating an attribute of the content 180. Specifically, the attribute 182 includes a size 183, a service group 184, an authentication method 185, a publication date and time 186, and the like. Here, the size 183 is, for example, information indicating bit capacity of the content 180. Further, the service group 184 is information indicating a service group capable of receiving the service of the content 180. Further, the authentication method 185 is information indicating an authentication method necessary for receiving the service of the content 180. Further, the publication date and time 186 is information indicating publication date and time of the content 180.

The ranking information 187 is an index indicating the number of accesses to the service of the content 180 (or access ranking). That is, the ranking information 187 is an index indicating how many people are interested in the content 180. Further, with respect to the ranking information 187, the index is given based on the number of times when the content 180 were accessed in the past and the previous reputation of the content. For example, the ranking information 187 is obtained by the addition of the number of accesses and a value indicating the previous reputation of the content.

Further, as the ranking information 187, a plurality of pieces of ranking information (for example, today ranking 188, weekly ranking 189, and annual ranking 190) for each aggregated period is added.

The main body information 191 is information of a content main body.

Here, an entirety or a part of supplementary information (the ID 181, the attribute 182 and the ranking information 187) other than the main body information 191 is stored as service information in the service management table 330. Then, the supplementary information stored in the service management table 330 (illustrated in FIG. 3A and FIG. 3B) is extracted as service discovery information to be loaded on the beacon as necessary.

Figure 8:
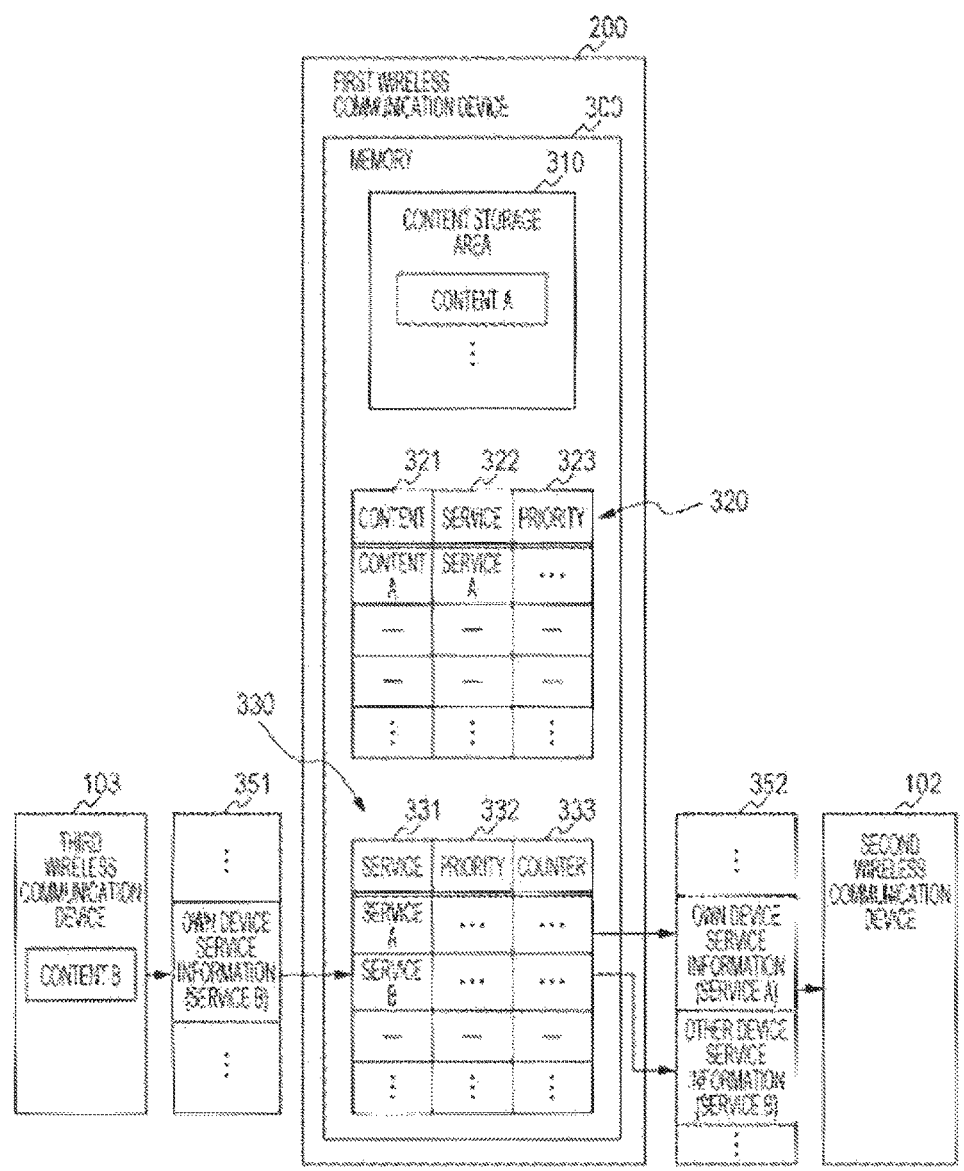
FIG. 8 is a diagram schematically illustrating a How of transmission and reception of service discovery information in the communication system in the first embodiment of the parent technology.
Figure 9:
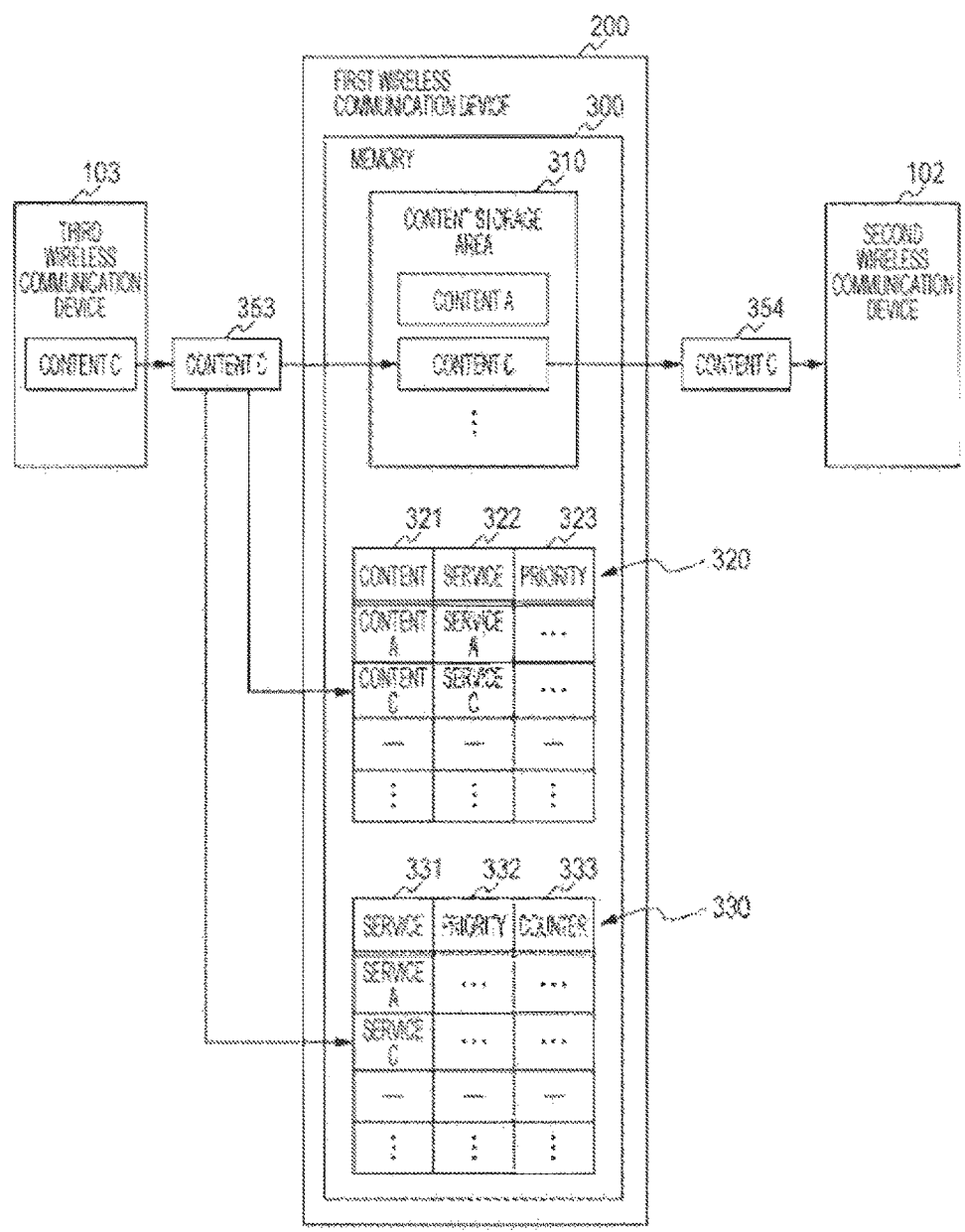
FIG. 9 is a diagram schematically illustrating a flow of transmission and reception of a content in the communication system in the first embodiment of the present technology.

Further, the main hotly information 191 is stored in the content, storage area 310 of the memory 300 (illustrated in FIGS. 8 and 9). Further, with respect to the contents stored in the content storage area 310 of the memory 300, the service information (index information to the contents) is registered in the content management table 320 and managed (illustrated in FIG. 3A and FIG. 3B). Further, as described above, the service that can be provided by the first wireless communication device 200 is registered in the content management table 320 in the order of priority.

Here, when transmitting the content, the first wireless communication device 200 may add information of the content management table 320 and the service management table 330, as supplementary information of the content being a transmission target (ranking information, and the like) to the content main body, and transmit the added information. In this case, it is possible to receive ranking information of a transmission source of the content even in the relay station of the content distribution.

"Transmission and Reception Example of Service Discovery Information"

FIG. 8 is a diagram schematically illustrating a flow of transmission and reception of service discovery information in the communication system 100 in the first embodiment of the present technology. In FIG. 8 schematically illustrates a flow when the service discovery information (included in a beacon) is transmitted in the order of the third wireless communication device 103->a first wireless communication device 200 ->the second wireless communication device 102.

A beacon 331 shows a beacon transmitted by the third wireless communication device 103 to the first wireless communication device 200, while a beacon 352 shows a beacon transmitted by the first wireless communication device 200 to the second wireless communication device 102.

For example, it is assumed that content A is stored in the memory 300 of the first wireless communication device 200, and content B is stored in the memory of the third wireless communication device 103. In this case, the first wireless communication device 200 is able to provide service A (a service corresponding to content A), and the third wireless communication device 103 is able to provide service B (a service corresponding to content B).

First, the third wireless communication device 103 includes service discovery information (own device service information) regarding service B (content B) in the beacon 351 and transmits the service discovery information to the first wireless communication device 200.

The control unit 240 of the first wireless communication device 200 that has received the beacon 351 stores the service information (service B) in the service management table 330, based on the service discovery information contained in the received beacon 351. That is, service A regarding content A stored in the memory 300 of the first wireless communication device 200 and service B regarding content B stored in the memory of the third wireless communication device 103 are registered in the service management table 330.

Further, the control unit 240 of the first wireless communication device 200 generates service discovery information based or service information stored in the service management table 330. Here, in an example illustrated in FIG. 8, service A and service B are registered in the service management table 330. Therefore, the third wireless communication device 103 includes service discovery information (own device service information and other device service information) regarding service A (content A) and service B (content B) in the beacon 352 and transmits the beacon to the first, wireless communication device 200. That is, the own device service information regarding service A and the other device service information regarding service B are transmitted.

"Transmission and Reception Example of a Content"

FIG. 9 is a diagram schematically illustrating a flow of transmission and reception of a content in me communication system 100 in the first embodiment of the present technology. In FIG. 9 schematically illustrates a flow when content C is transmitted in the order of the third wireless communication device 103->a first wireless communication device 200->the second wireless communication device 102.

Content C (353) shows contents transmitted by the third wireless communication device 103 to the first wireless communication device 200, and content C (354) shows contents transmitted by the first wireless communication device 200 to the second wireless communication device 102.

Here, the content C (353) and the content C (354) have the same main body information 191 (illustrated in FIG. 7), but have different, supplementary information (for example, ranking information 187 illustrated in FIG. 7).

For example, it is assumed that the content A is stored in the memory 300 of the first wireless communication device 200, and the content C is stored in the memory of the third wireless communication device 103. In this case, it is assumed that the third wireless communication device 103 provides the service C (corresponding to the content C) to the second wireless communication device 102 through the first wireless communication device 200.

First, the third wireless communication device 103 transmits the content C to the first wireless communication device 200. Here, the first wireless communication device 200 stores the received content C in the content storage area 310 of the memory 300.

In this case, the control unit 240 of the first wireless communication device 200 stores the received content C in the content storage area 310, and stores the service information (service C) in the content management table 320 and the service management table 330. That is, the services A and C regarding the contents A and C stored in the memory 300 of the first wireless communication device 200 are registered in the content management table 320 and the service management table 330.

Further, the control unit 240 of the first wireless communication device 200 transmits content C (354) to the second wireless communication device 102. That is, the service C (service corresponding to the content C) is provided from the third wireless communication device 103 to the second wireless communication device 102 through the first wireless communication device 200. In this case, the content C is cached in the first wireless communication device 200.

In addition, for ease of explanation, FIGS. 8 and 9 illustrate an example when the number of services registered in the content management table 320 and the service management table 330 is small. However, when the number of services registered in the content management table 320 and the service management table 330 is large, as described above, it is not preferable from the viewpoint of data amount to notify all services to peripheral devices. Incidentally, in the embodiment of the present technology, the priority (ranking information) of the service information is appropriately modified and only service discovery information regarding a service that satisfies a predetermined condition is notified to the peripheral devices. Further, based on the priority (ranking information) of contents, it is determined whether or not to store the contents in the memory 300.

"Communication Example"

Figure 10:
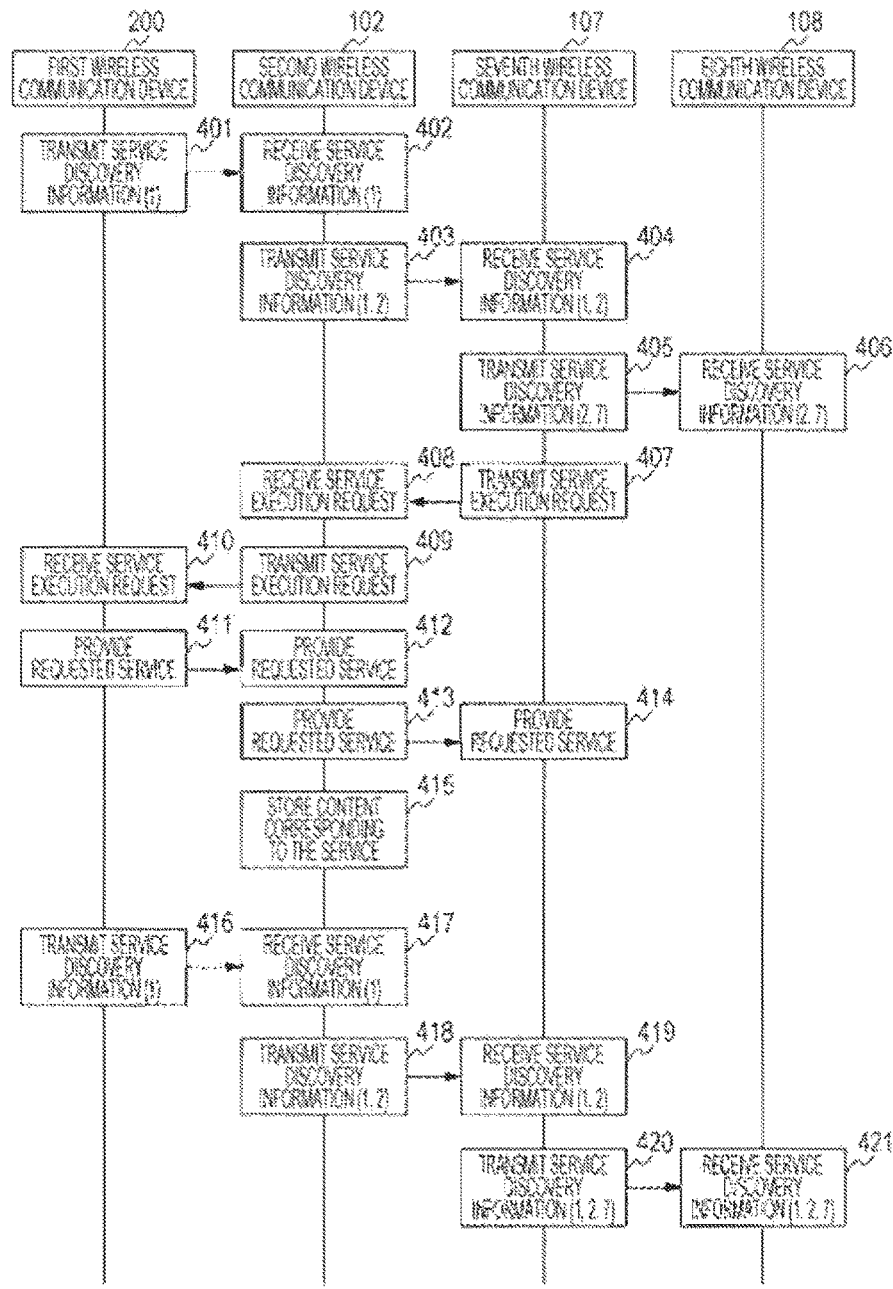
FIG. 10 is a sequence chart illustrating a communication processing example in each device constituting the communication system in the first embodiment of the present technology.

FIG. 10 is a sequence chart illustrating a communication processing example in each device constituting the communication system 100 in the first embodiment of the present technology. In addition, FIG. 10 illustrates a communication processing example when the first wireless communication, device 200, the second wireless communication device 102, the seventh wireless communication device 107, and the eighth wireless communication device 108 are present in a topology illustrated in FIG. 1. Further, FIG. 10 illustrates a communication example when the number of transmissions of services being a notification target is limited to two.

The first wireless communication device 200 notifies each wireless communication device present in the neighborhood of service discovery information (401 and 402). For example, the first wireless communication device 200 transmits a beacon containing service discovery information to the second wireless communication device 102 present in the neighborhood (401, 402).

In addition, in FIG. 10, the number representing a wireless communication device that provides a service contained in the service discovery information is shown within parentheses followed by the service discovery information. That is, for example, service discovery information (1) indicates the service discovery information regarding the service provided by the first wireless communication device 200. Further, service discovery information (1,2) indicates the service discovery information regarding the service provided by the first wireless communication device 200 and the service provided by the second wireless communication device 102. Further, service discovery information (2,7) indicates the service discovery information regarding the service provided by the second wireless communication device 102 and the service provided by the seventh wireless communication device 107.

Further, the service discovery information (1) regarding the service provided by the first wireless communication device 200 is transmitted as the own device service information 157 (illustrated in FIG. 5A and FIG. 5B) (401,402).

The second wireless communication device 102 receives the service discovery information (1) from the first wireless communication device 200, thereby detecting which service a transmission source (first wireless communication device 200) provides.

Subsequently, the second wireless communication device 102 notifies the service discovery information (1,2) to each wireless communication device present in the neighborhood (403,404). For example, the second wireless communication device 102 transmits the beacon containing the service discovery information (1, 2) to the seventh wireless communication device 107 present in the neighborhood (403, 404). Here, the service discovery information regarding the service provided by the first wireless communication device 200 and the service provided by the second wireless communication device 102 is contained in the service discovery information (1,2) transmitted from the second wireless communication device 102 to the seventh wireless communication device 107. In this case, service discovery information (2) regarding the service provided by the second wireless communication device 102 is transmitted as own device service information 157 (illustrated in FIG. 5A and FIG. 5B). On the other hand, the service discovery information (1) regarding the service provided by the first wireless communication device 200 is transmitted as other device service information 158 (illustrated in FIG. 5A and FIG. 5B).

The seventh wireless communication device 107 receives the service discovery information (1, 2) from the second wireless communication device 102, thereby detecting which service is provided by a transmission source (second wireless communication device 102) and a destination thereof (first wireless communication device 200).

Subsequently, the seventh wifeless commutation device 107 notifies each wireless communication device present in the neighborhood of the service discovery information (2, 7) (405,406). For example, the seventh wireless communication device 107 transmits the beacon containing the service discovery information (2, 7) to the eighth wireless communication device 108 present in the neighborhood (405, 406).

Here, as described above, since the number of transmissions is limited to two, the service provided by the first wireless communication device 200 is not contained in the service discovery information (2, 7) transmitted from the seventh wireless communication device 107 to the eighth wireless communication device 108. That is, the service discovery information regarding the service provided by the second wireless communication device 102 and the service provided by the seventh wireless communication device 107 is contained in the service discovery information (2, 7) transmitted from the seventh wireless communication device 107 to the eighth wireless communication device 108.

Further, service discovery information (7) regarding the service provided by the seventh wireless communication device 107 is transmitted as own device service information 157 (illustrated in FIG. 5A and FIG. 5B). On the other hand, the service discovery information (2) regarding the service provided by the second wireless communication device 102 is transmitted as other device service information 158 (illustrated in FIG. 5A and FIG. 5B).

The eighth wireless communication device 108 receives the service discovery information (2, 7) from the seventh wireless communication device 107, thereby detecting which service the transmission source (seventh wireless communication device 107) and the destination thereof (second wireless communication device 102) provide.

Here, it is assumed a case where the seventh wireless communication device 107 requests reception of the service provided by the first wireless communication device 200, based on the previously received service discovery information (1, 2).

The seventh wireless communication device 107 transmits a service execution request to the first wireless communication device 200 through the relay station (second wireless communication device 102) (407 to 410).

If receiving the service execution request (410), the first wireless communication device 200 reads the content (containing supplementary information) relating to the service execution request from the memory 300. Then, the first wireless communication device 200 transmits the read content (containing supplementary information) to the seventh wireless communication device 107 through the relay station (second wireless communication device 102) (411 to 414). Accordingly, the seventh wireless communication device 107 can receive a desired service (411 to 414).

Here, receiving the content from the first wireless communication device 200 is used as a trigger to cause the relay station (second wireless communication device 102) to activate a content reception event. The content reception event is an event that occurs such that the relay station or the wireless communication device capable of receiving a service can provide anew service. For example, when content is received from the neighboring wireless communication device and the new content from the I/O interface 230 is stored in the memory 300, a content reception event occurs. Moreover, for example, when multi-hopping and relaying by a relay are performed in order to transmit content to the neighboring wireless communication device, the content reception event occurs.

For example, when the content reception event is activated in the second wireless communication device 102 (412), it is assumed that it is determined that the second wireless communication device 102 stores a content. In this case, the content that has been stored in the first wireless communication device 200 (the content received by the second wireless communication device 102) is stored (cached) in the relay station (second wireless communication device 102) (415).

Further, for example, when the content reception event is activated in the seventh wireless communication device 107 (414), it is assumed that it was determined that the seventh wireless communication device 107 does not store the content. In this case, the content that has been stored in the first wireless communication device 200 (the content received by the second wireless communication device 102) is not stored in the seventh wireless communication device 107. In this manner, with respect to the same content, some wireless communication devices store the content, but other wireless communication devices do not store the content. In addition, the process (content storage process) of whether or not to store the content will be described in detail with reference to FIG. 13.

Further, each wireless communication device notifies the service discovery information to each wireless communication device present, in the neighborhood (416 to 421). Here, with respect to the service execution .requested by the seventh wireless communication device 107, after the service provisions (411 to 414) are terminated, it becomes a status in which even the relay station (second wireless communication device 102) can provide the relayed content. Therefore, the service discovery information regarding the service provided by the first, wireless communication device 200 is contained in the service discovery information (1, 2)

transmitted by the relay station (second wireless communication device 102), as the own device service information 157 (illustrated in FIG. 5A and FIG. 5B).

Further, if the seventh wireless communication device 107 receives the service discovery information from the second wireless communication device 102 (419), it is possible to detect that even the second wireless communication device 102 can provide the service provided by the first wireless communication device 200.

In this manner, even the second wireless communication device 102 can provide the service provided by the first wireless communication device 200. Therefore, as described above, even if the number of transmissions is limited to two, the service provided by the first wireless communication device 200 is contained in the service discovery information (1, 2, and 7) that is transmitted from the seventh wireless communication device 107 to the eighth wireless communication device 108. That is, the service discovery information regarding the service provided by the first wireless communication device 200, the service provided by the second wireless communication device 102 and the service provided by the seventh wireless communication device 107 are contained in the service discovery information (1, 2, and 7). In this case, the service discovery information (7) regarding the service provided by the seventh wireless communication device 107 is transmitted as own device service information 157 (illustrated in FIG. 5A and FIG. 5B). On the other hand, the service discovery information (1, 2) regarding the service provided by the second wireless communication device 102 is transmitted as other device service information 158 (illustrated in FIG. 5A and FIG. 5B).

The eighth wireless communication device 108 receives the service discovery information (1, 2, and 7) from the seventh wireless communication device 107 (421). By this reception, the eighth wireless communication device 108 can detect which service the transmission source (seventh wireless communication device 107) and the destination (second wireless communication device 102) provide. In this case, since even the second wireless communication device 102 can provide the service provided by the first wireless communication device 200, the eighth wireless communication device 108 can use even the service provided by the first wireless communication device 200.

In addition, FIG. 10 illustrates an example in which even if the number of transmissions is limited, when a wireless communication device that receives a service and a wireless communication device that relays the service store content for providing the service, a limit to the number of transmissions of the content is exceptionally relaxed. However, even when the wireless communication device that receives the service and the wireless communication device that relays the service store the content for providing the service, the number of transmissions may be limited according to the limit to the number of transmissions of the content. For example, as illustrated in FIG. 10, when the number of transmissions is limited to two, it is assumed a case where the second wireless communication device 102 stores the content corresponding to the service provided by the first wireless communication device 200. Even in this case, according to the number of transmissions (2), it is possible not to contain the service provided by the first wireless communication device 200 in the service discovery information that is transmitted from the seventh wireless communication device 107 to the eighth wireless communication device 108. Further, the relaxation of the limit to the number of transmissions may be changed according to the user setting.

In addition, FIG. 10 mainly describes a case of receiving content. However, in a case of receiving service discovery information, a process of registering the received service discovery information and the like are performed. Further, in a case of receiving the service discovery information, a process of changing the priority of service information and the like are performed. Each of these processes will be described in detail with reference to FIGS. 11 and 12.

"Operation Example 1 of a Wireless Communication Device"

Figure 11:
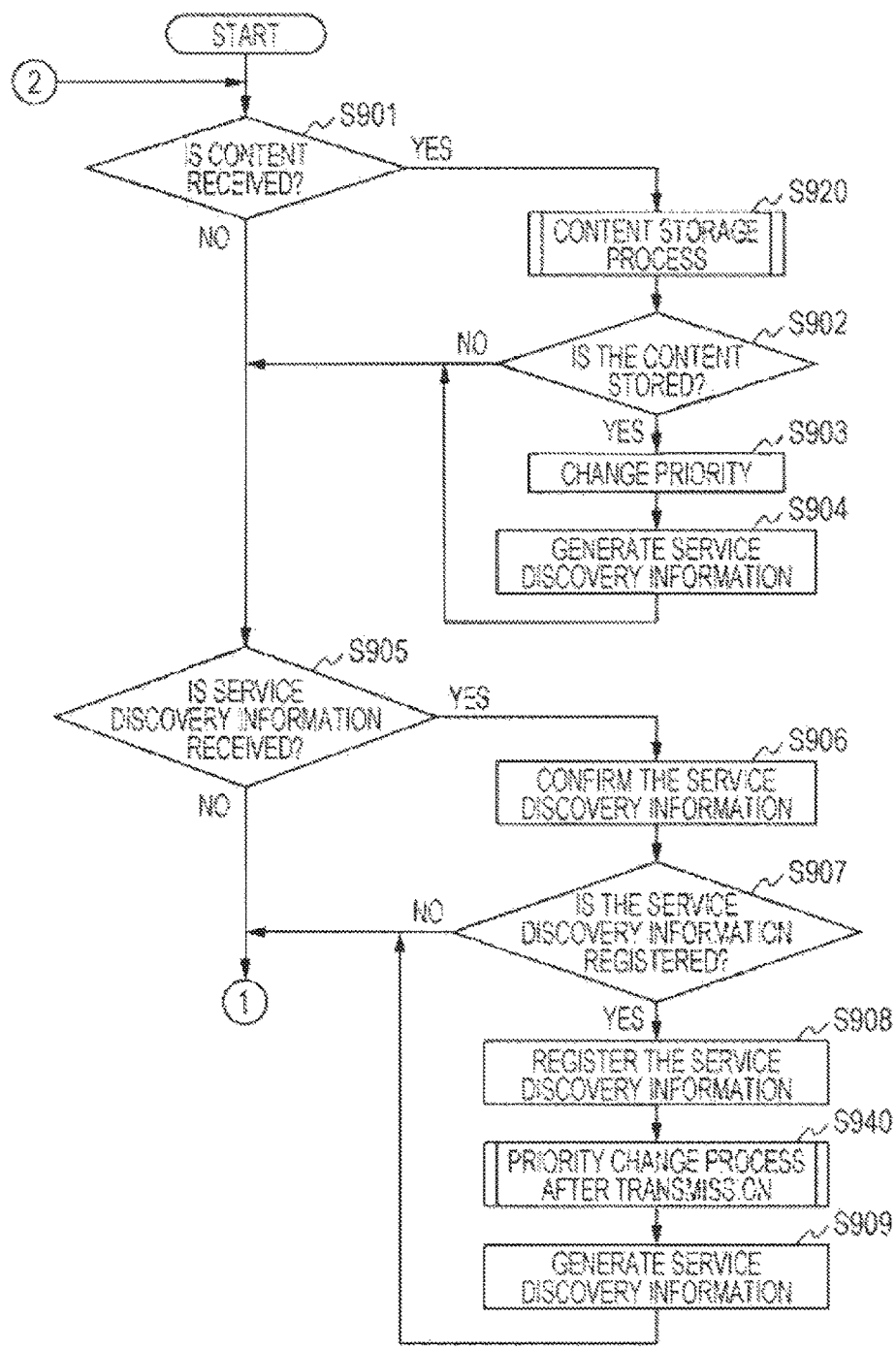
FIG. 11 is a flow chart illustrating an example of a processing sequence of a service information management control process by the first wireless communication device in the first embodiment of the present technology.
Figure 12:
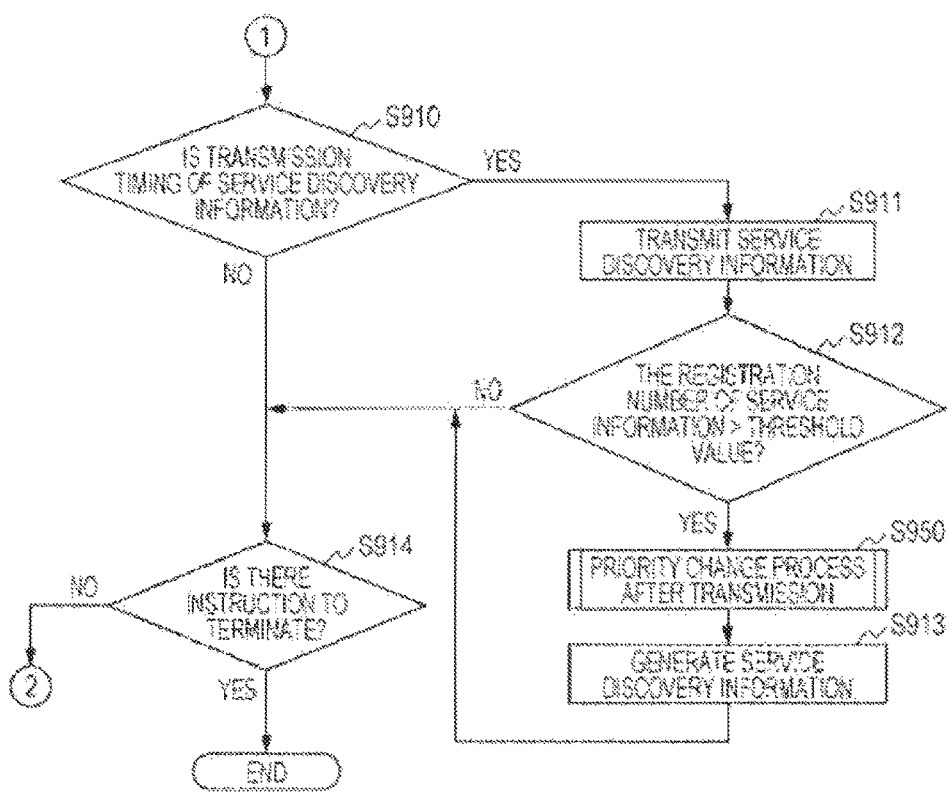
FIG. 12 is a flow chart illustrating an example of a processing sequence of the service information management control process by the first wireless communication device in the first embodiment of the present technology.

FIGS. 11 and 12 are flow charts illustrating an example of a processing sequence of the service information management control process by the first wireless communication device 200 in the first embodiment of the present technology.

First, transition to a wait state for respective events is performed (steps S901, S905, S910). Here, the events are respectively a content reception event, a service discovery information reception event, and a service discovery information transmission event. Then, when the service discovery information is received or transmitted, or when it becomes a timing to start, the service provision (for example, when a start operation by the user is received), the corresponding event occurs, and the event is initiated to be processed. In addition, in FIG. 11, the case where content is received from the neighboring wireless communication device is described as an example of a case where the content reception event occurs.

Further, the service discovery information reception event is an event that occurs in response to a reception of the service discovery information (or, a signal containing the same (for example, beacon)) from the neighboring wireless communication device.

Further, the service discovery information transmission event is an event that occurs at a timing to transmit the service discovery information (or, a signal containing the same (for example, beacon)).

When the first wireless communication device 200 receives content from the neighboring wireless communication device (that is, when the content reception event occurs) (step S901), the content storage process to determine whether or not to store the received content is performed (step S920). The content storage process will be described in detail with reference to FIG. 13.

Subsequently, in the content storage process (step S920), the control unit 240 determines whether the content is stored in the memory 300 (step S902), Then, when the content is not stored in the memory 300 (step S902), the process proceeds to step S905. That is, the process returns to an event waiting state.

Figure 16:
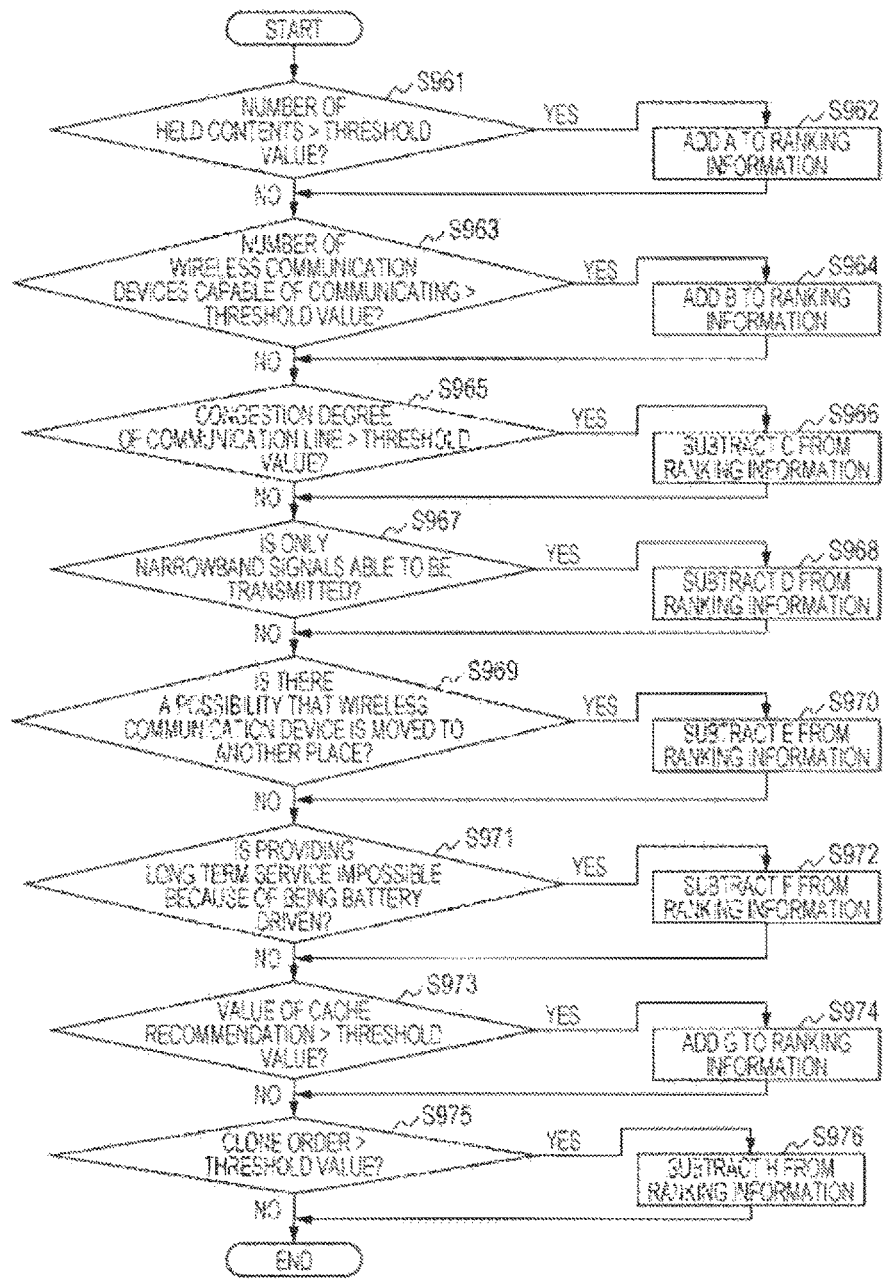
FIG. 16 is a flow chart illustrating an example of a processing sequence of a change control process of ranking information (priority) by the first wireless communication device in the first embodiment of the present technology.

When the content is stored in the memory 300 (step S902), the control unit 240 changes the priority of service informatics (step S903). For example, when a new content is stored in the memory 300 (step S902), it is preferable that the first wireless communication device 200 actively notify the service discovery information regarding the new content. Incidentally, since the first wireless communication device 200 actively notifies the service discovery information regarding the new content, a process for raising the priority of the new content (a process of upwardly adjusting the priority (ranking information) of the new content) is performed. Further, as shown in FIG. 16, a change process may be performed or the priority of the new content.

Subsequently, the control unit 240 generates service discovery information to be transmitted next time based on the service management table 330 (step S904). For example, the service discovery information of the service information of a predetermined number, of which priority is high out of service information registered in the service management table 330, is generated (step S904). Then, the process proceeds to step S905. That is, the process returns to the event waiting state.

In a case of receiving the service discovery information (that is, a case where the service discovery information reception event occurs) (step S905), the control unit 240 confirms the received service discovery information (step S906). That is, the control, unit 240 interprets the received service discovery information (step S906), and determines whether or not to register the received service discovery information in the service management table 330 (step S907). For example, the control unit 240 uses the priority (for example, the lowest priority) of the service information registered in the service management table 330 as a reference. Then, the control, unit 240 determines whether the ranking information 166 (illustrated in FIG. 5A, FIG. 5B and FIG. 6) having a higher priority than the priority that has been used as the reference is contained in the received service discovery information. Then, the control unit 240 registers the service discovery information corresponding to the ranking information 166, having a higher priority than the priority that has been used as the reference, as service information in the service management table 330 (step S908). In addition, the service discovery information having a lower priority than, the reference priority is not registered in the service management table 330.

Subsequently, a priority change process after transmission is performed (step S940), The priority change process after transmission will be described in detail with reference to FIG. 14.

Subsequently, the control unit 240 generates service discovery information to be transmitted next time based on the service management table 330 (step S909). In addition, the generation method of the service discovery information is the same as step S904.

When it becomes a timing to transmit, the service discovery information (that is, when the service discovery information transmission event occurs) (step S910), the control unit 240 transmits the service discovery information (step S911). That is, the control unit 240 performs a process that arranges the generated service discovery information (own device service information 157 and other de-vice service information 158 (illustrated in FIG. 5A and FIG. 5B)) with a format in which the information is loaded in a signal and becomes a transmittable state (step S911). Then, the service discovery information is transmitted (step S911). For example, a beacon containing the generated service discovery information is transmitted (step S911). In addition, the service discovery information is generated in, for example, steps S904, S909 and S913.

Subsequently, the control unit 240 determines whether the number of service information registered in the service management table 330 exceeds a threshold value (for example, the number available to be contained in the beacon) (step S912). Then, when the number of service information registered in the service management table 330 is the threshold value or less (step S912), the process proceeds to step S914. On the other hand, when the number of service information registered in the service management table 330 exceeds the threshold value, a priority change process after transmission that changes the priority registered in the service management table 330 is performed (step S950). In addition, the priority change process after transmission will be described in detail with reference to FIG. 15.

Subsequently, the control unit 240 generates service discovery information to be transmitted next time, based on the service management table 330 (step S913). In addition, a generation method of the service discovery information is the same as step S904.

Subsequently, it is determined whether a termination of an operation of a service information management control process is instructed (step S914). When the termination is instructed, the operation of the service information management control process is terminated. On the other hand, when the termination of the operation of the service information management control process is not instructed (step S914), the process returns to step S901. In addition, steps S905, S910, S911 are an example of the communication procedure. Further, steps S903, S940, S950 are an example of a communication procedure.

Here, it is assumed that the service contained in the service discovery information (for example, specified as the content ID 164) has already been registered in the service management table 330. In this case, it is possible to provide the same service to other wireless communication devices. Incidentally, when the received service contained in the service discovery information has already been registered in the service management table 330, only the service having higher ranking information than that of the registered service may be stored.

For example, the control unit 240 compares the ranking information 166 contained in the received service discovery information with the priority of the service registered in the service management table 330, and stores only the service having high ranking. Accordingly, it is possible to avoid a duplicate service from being registered. Further, since each wireless communication device that has received the service discovery information acquires a desired service from the wireless communication device having high ranking information, it is possible to effectively use a network.

"Operation Example 2 of a Wireless Communication Device"

Figure 13:
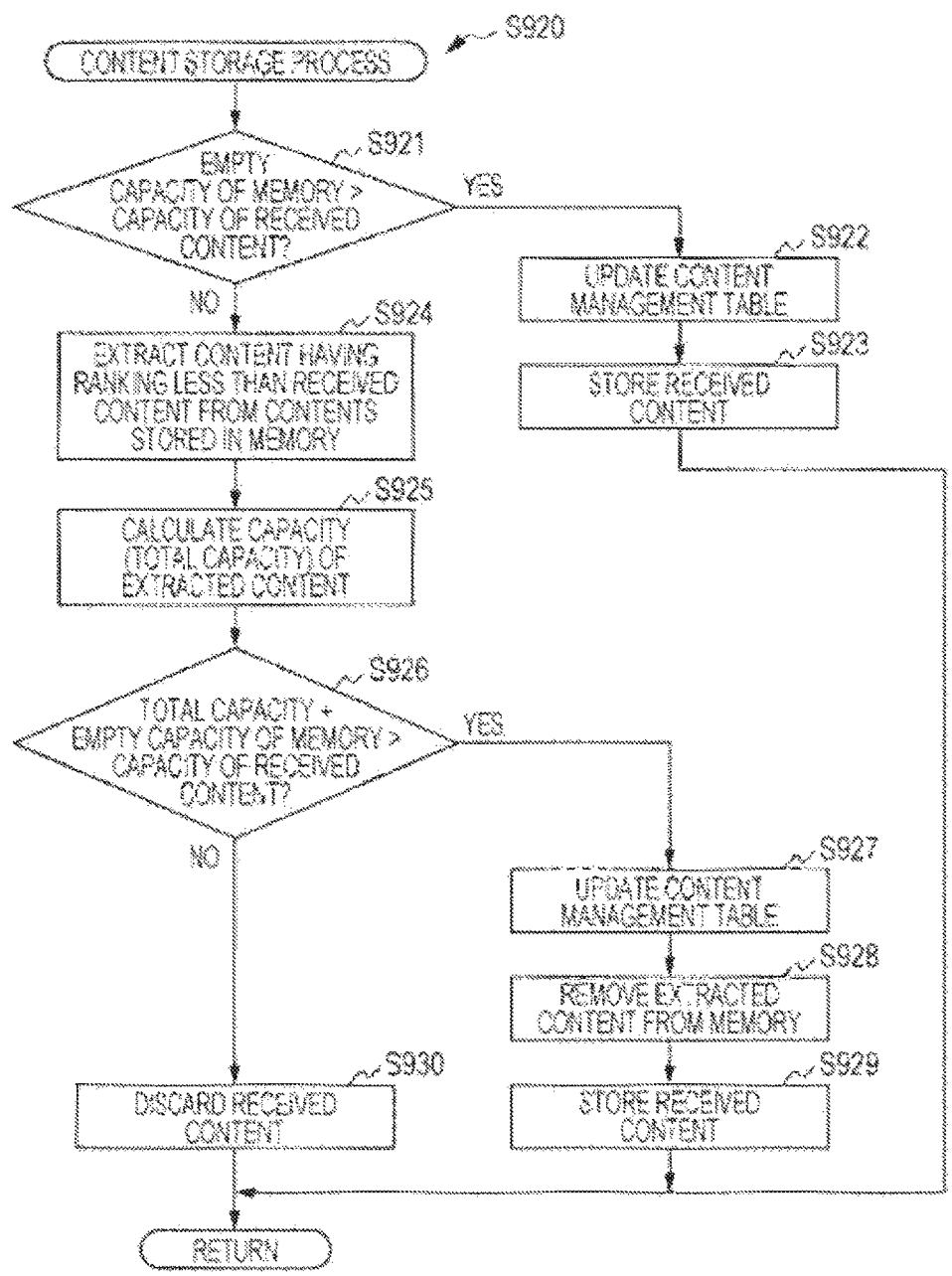
FIG. 13 is a flow chart illustrating an example of the content storage processing sequence in the processing sequence of the service information management control process by the first wireless communication device in the first embodiment of the present technology.

FIG. 13 is a flow chart illustrating an example of a content storage processing sequence (processing sequence of step S920 illustrated in FIG. 11) in the processing sequence of service information management control process by the first wireless communication device 200 in the first embodiment of the present technology.

First, the control unit 240 determines whether an empty area for storing the received content is present in the memory 300 (step S921). That is, it is determined whether the free space of the memory 300 (for example, the free space of the content storage area 310 illustrated in FIGS. 8 and 9) is greater man the capacity of the received content (step S921).

When an empty area for storing the received content is present in the memory 300 (step S921), the control unit 240 registers the received content in the content management table 320 and the service management table 330 (step S922). For example, the control unit 240 acquires the ranking information 187 of the received content (illustrated in FIG. 7). Then, the control unit 240 registers the acquired ranking information 187 respectively as priorities 323, 332 (illustrated in FIG. 3A and FIG. 3B) in the content management table 320 and the service management table 330. In this case, a registration positions for the content management table 320 and the service management table 330 are determined based on the ranking information 187 (illustrated in FIG. 7) of the received content. Further, after the change process illustrated in FIG. 16 is performed on the ranking information 187 of the received content, a registration process to the content management table 320 and the service management table 330 may be performed.

Subsequently, the control unit 240 stores the received content in the empty area of the memory 300 (step S923).

Further, when the empty area is not present in the memory 300 (step S921), the control unit 240 determines whether or not to store the received content if content having a low priority is removed from the memory 300 (steps S924 to S926). For example, the control unit 240 acquires ranking information 187 (illustrated in FIG. 7) of the received content, and compares the ranking information 187 of the received content with the ranking information of the contents stored in the memory 300 (step S924). That is, the ranking information 187 of the received content and the priority registered in the content, management table 320 are compared (step S924). Then, the control unit 240 extracts the content having lower ranking information man the received content, from the contents that are stored in me memory 300 (step S924).

Subsequently, the control unit 240 calculates the capacity (total capacity) of the extracted content (content of which ranking is less than the ranking of the received content) (step S925). Subsequently, the control unit 240 compares a total value of the calculated capacity (total capacity) of the content and the empty capacity of the memory 300 with the capacity of the received content, and determines whether the total value is larger man the capacity of the received content (step S926). That is, it is determined whether the received content can be stored if the content (contents stored in the memory 300) of which ranking falls below the ranking information of the received content is discarded (step S926).

When the total value is larger than the capacity of the received content (step S926), the control unit 240 updates the content management table 320 and the service management table 330, based on the permutation of the compared priority (ranking information) (step S927). That is, the received content is registered in the content management table 320 and the service management table 330 (step S927). In this case, the control unit 240 removes the extracted content (content of which ranking is less than the ranking of the received content) that has been registered from the content management table 320.

Subsequently, the control unit 240 removes the extracted content (content of which ranking is less than the ranking of the received content) from the memory 300 (step S928). Subsequently, the control unit 240 stores the received content in the empty area of the memory 300 (step S929).

Further, when the total value of the capacity (total capacity) of the calculated content and the empty capacity of the memory is equal to or less than the capacity of the received content (step S926), the control unit 240 discards the received content (step S930).

Here, as illustrated in FIG. 7, a plurality of rankings (attribute ranking such as different time series or the like) are included in the ranking information 187 incidental to the received content. Therefore, at the time when the aforementioned ranking comparison is performed (step S922, S924, S927) it is preferable to perform a comparison and determination based on the ranking attribute according to the preference of the user, depending on the taste of the user of the first wireless communication device 200. The taste of the user can be determined by, for example, a manual operation by the user (for example, a selection operation using use ranking selection buttons 511 to 513 illustrated in FIG. 17) or an automatic setting based on history information of the past. For example, in a ease of performing the automatic setting, the number of accesses by the user is the past is aggregated and ranking attribute that is strongly correlated with the content that is most frequently accessed by the user is learned, whereby the taste of the user can be set.

In addition, there are content that can be cached (for example, a music content a movie content, a moving picture content) and content that is not cached (for example, real-time moving picture). It is possible to determine whether or not the content can be cached, using content identification information (for example, the service type 163, the content ID 164 that are illustrated in FIG. 5A, FIG. 5B and FIG. 6).

In this manner, the control unit 240 determines whether or not to store the received content in the memory 300, based on the relationship between the capacity of the received content and the storage capacity of the memory 300, and the priority of the content stored in the memory 300. For example, the control unit 240 extracts and removes the content satisfying a predetermined condition from the contents stored in the memory 300, when the capacity of the received content exceeds the storage capacity of the memory 300. Here, the content satisfying a predetermined condition is, for example, the content of which priority is lower than that of the received content. Then, the control unit 240 stores the received content in the memory 300.

"Operation Example 3 of a Wireless Communication Device"

Figure 14:
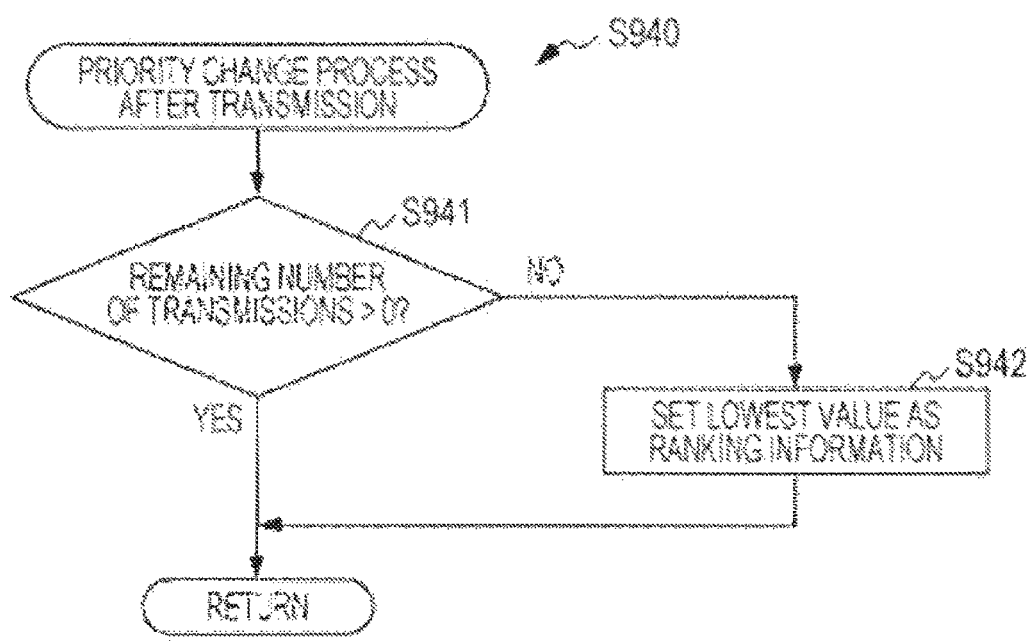
FIG. 14 is a flow chart illustrating an example of a priority change processing sequence after reception in the processing sequence of the service information management control process by the first wireless communication device in the first embodiment of the present technology.

FIG. 14 is a flow chart illustrating an example of a priority change processing sequence after reception (processing sequence of step S940 illustrated in FIG. 11) in the processing sequence of service information management control process by the first wireless communication device 200 in the first embodiment of the present technology.

As described above, in a case where the service discovery information has been received (step S905 illustrated in FIG. 11), it is possible to register the ranking information 166 (illustrated in FIG. 5A, FIG. 5B and FIG. 6) contained in the service discovery information as a priority (step S908 illustrated in FIG. 11). That is, it is possible to use the value of the ranking information 166 (illustrated in FIG. 5A, FIG. 5B and FIG. 6) as a parameter indicating the priority. Further, the ranking information may be corrected by the change process illustrated in FIG. 16, and the value on which this correction has been performed (corrected ranking information) may be used as a parameter indicating the priority.

Here, in a case where the remaining number of transmissions contained in the service type 163 (illustrated in FIG. 5A, FIG. 5B and FIG. 6) contained in the service discovery information is 0, thereafter, it is not possible to transfer the service discovery information. Incidentally, the control unit 240 determines whether the remaining number of transmissions contained in the service type 163 contained in the service discovery information is 0 (step S941). Then, when the remaining number of transmissions contained in the service type 163 contained in the service discovery information is 0 (step S941), the control unit 240 sets the registered priority (ranking information) to the lowest value (step S942). In this case, the service discovery information may not be stored (for example, registration may be cancelled).

In this manner, when service discovery information is received from other wireless communication devices, in a case of determining whether the first wireless communication device 200 transfers the service discovery information, it is possible to refer to the number of transmissions and the like. As described above, it is possible to include the number of times indicating how many more times the service discovery information may be transferred (transferable number of times) in the service type 163 (illustrated in FIG. 5A, FIG. 5B and FIG. 6) of the service discovery information. For example, in a case where the transferable number of times is contained in the service type 163 of the service discovery information, it is possible to perform a process that does not register the service discovery information in the service management table 330 so as to prevent the service discovery information from being transmitted beyond the transferable number of times. Otherwise, service may be registered in the service management table 330 while the priority thereof may be lowered so as to prevent the service from being included in the other device service information 158 (illustrated in FIG. 5A and FIG. 5B) transmitted by the first wireless communication device 200. Accordingly, it is possible to provide service discovery information that limits an area, and to prevent useless information from being transmitted to a network.

"Operation Example 4 of a Wireless Communication Device"

Figure 15:
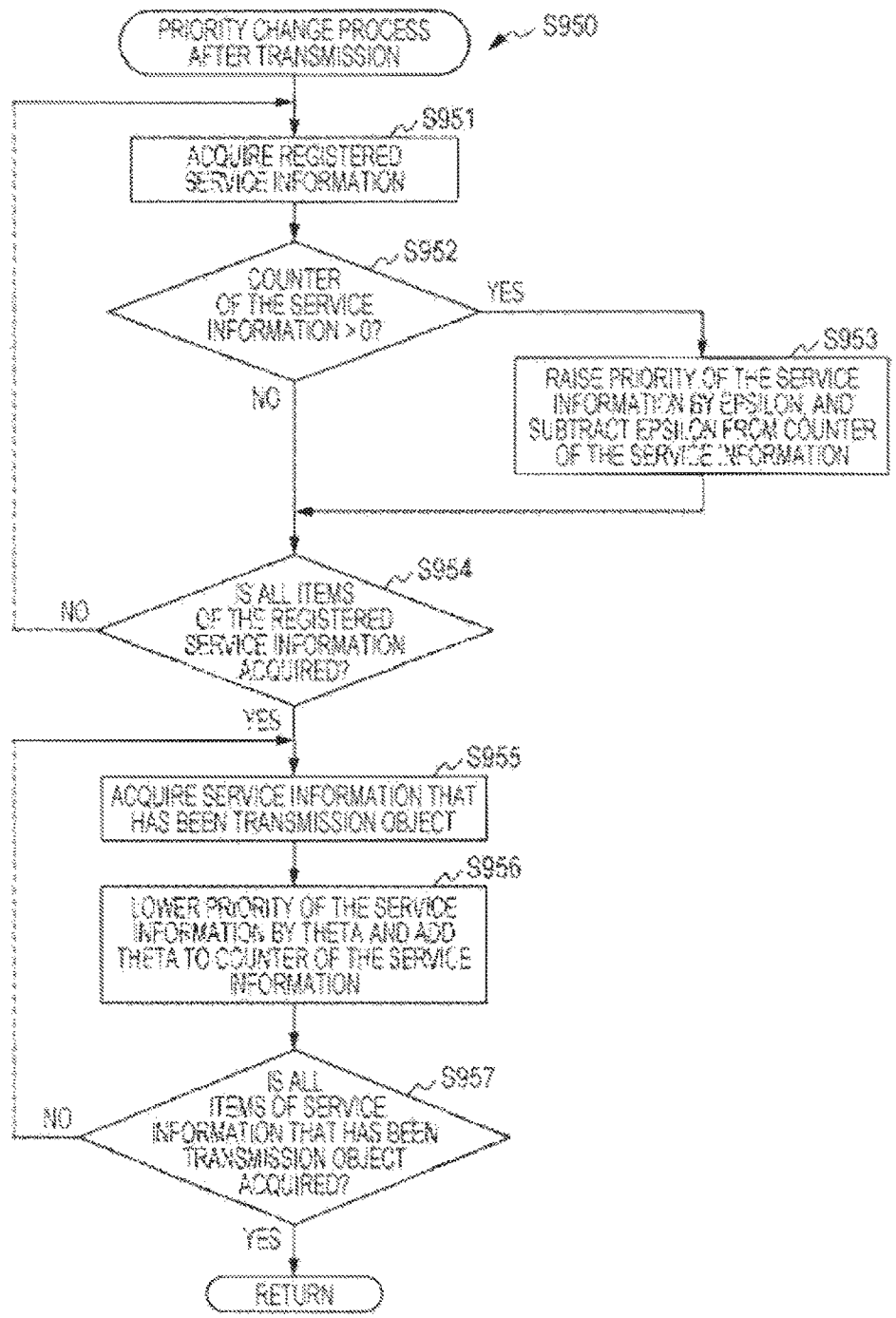
FIG. 15 is a flow chart illustrating an example of the priority change processing sequence after transmission in the processing sequence of the service information management control process by the first wireless communication device in the first embodiment of the present technology.

FIG. 15 is a flow chart, illustrating an example of a priority change processing sequence after transmission (processing sequence of step S950 illustrated in FIG. 11) in the processing sequence of service information management control process by the first wireless communication device 200 in the first embodiment of the present technology.

Here, with respect to the service of which the priority is relatively high, it is assumed that the service discovery information is frequently transmitted. However, if only service discovery information regarding the same service is notified, there is a concern that it is not possible to notify a presence of other services to neighboring wireless communication devices. Incidentally, in the embodiment of the present technology, a process of temporarily lowering a priority is performed with respect to the service relating to the service discovery information that is a transmission target. Accordingly, it is possible to prevent, only service discovery information regarding the same service from being notified audio sequentially transmit service, discovery information regarding each service.

First, the control unit 240 acquires service information regarding the service registered in the service management table 330 (step S951). Subsequently, the control unit 240 determines whether the counter of the acquired service information is greater than 0 (step S952). Then, when the counter is 0 (step S952), the process proceeds to step S954. On the other hand, when the counter is greater than 0 (step S952), the control unit 240 raises the priority of the acquired service information by epsilon, and reduces the counter of the acquired service information by epsilon (step S953). Here, epsilon is, for example, a positive integer.

Subsequently, the control unit 240 determines whether ail service information items registered in the service management table 330 have been acquired (step S954), then when all service information items have not been acquired, the process returns to step S951. On the other hand, when all service information items are acquired (step S951), the control unit 240 acquires service information that has been a present transmission target (step S955).

Subsequently, the control unit 240 lowers the priority of the acquired service information (service information that has teen a present transmission target) by theta, and adds the counter of the acquired service information by theta (step S956). Here, theta is, for example, a positive integer. Further, the magnitude relationships of epsilon and theta may be fixed or changed depending on the user's preference.

Subsequently, the control unit 240 determines whether all service information items that have been a present transmission target have been acquired (step S957), then when all service information items that are a present transmission target have not been acquired, the process returns to step S955. On the other hand, when all service information items that have been a present transmission target have been acquired (step S955), the operation of the priority change process after transmission is terminated.

in this manner, if a transmission process of the service discovery information is performed, the service information registered in the service management table 330 is scanned, and the service of which counter value is non-zero is extracted. Then, with respect to each piece of service information that is extracted, the priority thereof is changed by epsilon and returned to the original priority, and the counter thereof is reduced by epsilon. In this manner, each time when a transmission event occurs, a process of returning the priority of each piece of service information to the original value and lowering the counter value is performed.

Then, with respect to all service information items that have been a present transmission target, the priority of each piece of service information is lowered by theta, and the counter is added by theta. Accordingly, although the priority of all service information items that have been a present transmission target is lowered by theta, thereafter, the priority is gradually returned by the value that is added in the counter.

That is, each time when service discovery information is transmitted, the priority of the service registered in the service management table 330 (service other than the service that has been a transmission target) is updated to be increased. For this reason, it is possible to notify the service registered in the service management, table 330 to other wireless communication devices at any timing.

In this manner, the control unit 240 can change the number of transmissions for other wireless communication devices of the service discovery information, based on ranking information (priority) contained in the service discovery information.

"Operation Example 3 of a Wireless Communication Device"

FIG. 16 is a flow chart illustrating an example of a processing sequence of a ranking information (priority) change control process by the first wireless communication device 200 in the first embodiment of the present technology. The ranking information change control process can be performed regularly or irregularly on the priority (ranking information) of the service registered in, for example, the content management table 320 and the service management table 330. Further, the ranking information change control process may be appropriately performed, for example, as described above, at the time of receiving contents, at the time of registering service information, and the like.

First, the control unit 240 determines whether the number of contents stored in the memory 300 exceeds a threshold value, based on the management content of the content management table 320 (step S961). That is, it is determined whether the first wireless communication device 200 has an ability of providing services of a predetermined number or more. Then, when the number of contents stored in the memory 300 exceeds the threshold value (step S961), A is added to the priority (ranking information) of service information (step S962). That is, an upward adjustment of priority (ranking information) of service information is performed.

Subsequently, the control unit 240 determines whether the number of neighboring wireless communication devices capable of communicating exceeds the threshold value, based on information about the number of communications that are possible by the communication unit 220 (step S963). That is, it is determined whether the first wireless communication device 200 is present in a location where the communication network 200 can communicate with relatively large number of wireless communication devices. Then, when the number of neighboring wireless communication devices capable of communicating exceeds the threshold value (step S963), B is added to the priority (ranking information) of service information (step S964). That is, an upward adjustment of die priority (ranking information) of service information is performed.

Subsequently, the control unit 240 determines whether the congestion, degree of a communication line exceeds the threshold value, based on congestion degree information from the communication unit 220 (step S965). That is, it is determined whether the first wireless communication device 200 is present in a location where the communication line is congested. Then, when the congestion degree of a communication line exceeds the threshold value (step S965), C is subtracted from the priority (ranking information) of service information (step S966). That is, a downward adjustment of the priority (ranking information) of service information is performed.

Subsequently, the control unit 240 determines whether the first wireless communication device 200 can transmit only narrowband signals based on communication status information from the communication unit 220 (step S967). That is, it is determined whether the first wireless communication device 200 does not transmit wideband signals, but can transmit only narrowband signals. Then, when it is determined that transmission of only narrowband signals is possible (step S967), D is subtracted from the priority (ranking information) of service information (step S968). That is, a downward adjustment of the priority (ranking information) of service information is performed.

Subsequently, control unit 240 determines whether there is a possibility that the first wireless communication device 200 is moved and transferred to another location, based on movement information from the movement detection unit 260 (step S969). For example, it is determined whether the user of the first wireless communication device 200 is moving (for example, the user is moving by a vehicle or on foot). For example, when a movement continues for a predetermined time, and thus a moving distance of the first wireless communication device 200 (for example, a moving distance per unit time) is equal to or more than a predetermined value (for example, 50 m per a minute), it is determined that-the user of the first wireless communication device 200 is moving. Then, when there is a possibility that the first wireless communication device 200 is moved and transferred to another location (step S969), E is subtracted from the priority (ranking information) of service information (step S970). That is, a downward adjustment of the priority (ranking information) of service information is performed.

Subsequently, the control unit 240 determines whether providing a long term service is possible based on an estimated remaining battery amount (step S971). For example, when the first wireless communication device 200 is driven by a battery (battery-driven), and the remaining battery amount is less than a threshold value, it is determined that it is difficult to provide the long term service. Then, when it is difficult to provide the long term service (step S971), F is subtracted from the priority (ranking information) of service information (step S972). That is, a downward adjustment of the priority (ranking information) of service information is performed.

In addition, the priority (ranking information) of service information may be changed in a step-wise manner. For example, the priority of a wireless communication device present in a location to which many routes tend to converge may be controlled to be increased until an accommodated traffic exceeds a threshold value, and then the priority may be controlled to be lowered when the accommodated traffic exceeds the threshold value.

In addition, the priority of a wireless communication device present in a location to which many routes tend to converge may be controlled to be increased until an accommodated traffic exceeds a threshold value, and then the priority may be controlled to be lowered when the accommodated traffic exceeds the threshold value.

Here, as described above, the cache recommendation 167 (illustrated in FIG. 5A, FIG. 5B and FIG. 6) and the clone order 168 (illustrated in FIG. 5A, FIG. 5B and FIG. 6) are used for determining whether or not to cache a content main body. However, they may be used as elements for changing the ranking information (priority) contained in the service discovery information. Specifically, when the ranking information is changed to determine a priority of a service, an upward adjustment of the ranking information is performed depending on a degree of the cache recommendation and a downward adjustment of the ranking information is performed when the clone order exceeds a threshold value. This example will be described later.

The control unit 240 determines whether the value of the cache recommendation 167 (illustrated in FIG. 5A, FIG. 5B and FIG. 6) stored in the service discovery information exceeds a threshold value (step S973). Then, when the value of cache recommendation 167 exceeds the threshold value (step S973), G is added to the priority (ranking information) of service information (step S974). That is, an upward adjustment of priority (ranking information) of service information is performed.

Subsequently, the control unit 240 determines whether the value of the clone order 168 (illustrated in FIG. 5A, FIG. 5B and FIG. 6) stored in the service discovery information exceeds a threshold value (step S975). Then, when the value of clone order exceeds the threshold value (step S975), H is subtracted from the priority (ranking information) of service information (step S976). That is, a downward adjustment of the priority (ranking information) of service information is performed.

In addition, the priority (ranking information) of service information may be changed based on a timing when a content is stored in the memory 300. For example, with respect to the content stored in the memory 300 within a predetermined period (for example, within a day), the priority may be increased only within the period. That is, the control unit 240 can change the priority based on the timing when the content is stored in the memory 300.

In addition, it is preferable that respective processes of steps S973 to S976 be performed at the time of receiving service discovery information.

Further, the same determinations are performed for each wireless communication device in respective processes of steps S961, S963, S965, S967, S969, and S971. On the other hand, since determinations are performed for respective services in respective processes of steps S973 and S975, different, determinations may be performed on the same wireless communication device.

Further, the ranking information (priority) may be changed by performing all respective processes illustrated in FIG. 16, and the ranking information (priority) may be changed by performing some process thereof. For example, the ranking information (priority) may be changed by performing some processes thereof, depending on the preference of the user. In this case, processes to be performed by the user's operation (for example, determination processes regarding the congestion degree and the communication status (step S965, S967)) may be set.

Further, the threshold value used in respective processes may be appropriately set according to the user's preference and the wireless communication device. Further, respective values (A to H) to be added to or subtracted from the ranking information (priority) may be appropriately set depending on the user's preference and the wireless communication device. In addition, it is assumed that, the respective values (A to H) to be added to or subtracted from the ranking information (priority) are positive values.

In this manner, the control unit 240 can change the ranking information (priority) contained in the service discovery information to be transmitted to other wireless communication devices, based on at least one of the use environment of the first wireless communication device 200 and the communication status of the first wireless communication device 200. In this case, it is possible to use as the use environment of the first wireless communication device 200, at least one of a hold state of a content, the number of other wireless communication devices capable of communicating using wireless communication, a movement status of the first wireless communication device 200, and a period of providing the service.

In this manner, it is possible to appropriately control the wireless communication device that transmits service discovery information by performing the upward adjustment or the downward adjustment of ranking information (priority of service information). For example, a control can be performed such that when the line load is not high, service discovery information is notified while a priority is given to a location to which many routes tend to converge, but if an accommodated traffic is increased, the priority is lowered.

Further, the ranking information (priority of service information) varies depending on the wireless communication device to be passed through. For example, relatively high ranking information (priority of service information) is output from the wireless communication device having a relatively good use condition. Meanwhile, relatively low ranking information (priority of service information) is output from the wireless communication device having a relatively bad use condition.

"Use Example of Other Information"

In the above, an example for determining the necessity or the like of registration to each table using priority (ranking information 166 (illustrated in FIG. 5A, FIG. 5B and FIG. 6)) is shown. However, respective processes may be performed using each piece of information other than the priority (ranking information 166 (illustrated in FIG. 5A, FIG. 5B and FIG. 6)). Here, an example in which respective processes are performed using the cache recommendation 167 (illustrated in FIG. 5A, FIG. 5B and FIG. 6) and the clone order 168 (illustrated in FIG. 5A, FIG. 5B and FIG. 6) is shown.

"Use Example of Cache Recommendation"

The first wireless communication device 200 can determine the presence or absence of storage of contents to the memory 300 based on the cache recommendation 167 (illustrated in FIG. 5A, FIG. 5B and FIG. 6).

The first wireless communication device 200 holds in the memory 300 the history information about the service provided in the past. Then, with respect to the content which is determined as being accessed many times by referring to the history information, the first wireless communication device 200 can encourage other wireless communication devices to perform a distribution, in order to distribute the load on the network. That is, it is possible to circulate the content (distribute processes in order for the traffic load to be even) for balancing of traffic load.

For example, the control unit 240 transmits to other wireless communication devices, service discovery information containing recommendation information for recommending the storage of the content that is large relative to the threshold value to other wireless communication devices. For example, for the content of which access probability is determined as being higher than the threshold value, a control is performed so as to increase the degree of cache recommendation contained in the service discovery information regarding the content.

Further, with respect to a case where ranking information incidental to the content is high (ranking information is high relative to the threshold value), similarly, the control unit 240 controls to increase the degree of cache recommendation contained in the service discovery information regarding the content.

For example, when receiving content or transmitting content, the first wireless communication unit 200 attempts to store the content in the memory 300 and to use the content as a cache. Further, when the empty capacity of the memory 300 becomes occupied, the cache may be rewritten based on the priority or the like of the content. However, when the empty capacity of the memory 300 becomes occupied, the cache may be rewritten based on the cache recommendation 167.

For example, when content of which the degree of the cache recommendation 167 is high is received or transmitted, it is attempted that the content is stored preferentially in the memory 300 and cached. Accordingly, after the content is cached, it becomes a state in which the content can be provided from the first wireless communication device 200. For this reason, after the content is cached, when the user wants to receive the service corresponding to the content, the service can be provided only by referring to the local memory 300, and thereby it is possible to prevent a useless communication from occurring.

"Use Example of Clone Order"

Further, it is possible to perform respective processes using the clone order 168 (illustrated in FIG. 5A, FIG. 5B and FIG. 6). For example, it is possible to determine whether or not to cache a content using the clone order 168.

For example, it is determined that the service is the content of which the number of times of copies is large based on the clone order 168, when the number of times of copies of the content is large, it is possible to lower the priority (for example, a value of the cache recommendation 167) for caching. Therefore, it is possible to avoid a disadvantage that the service is not provided because the number of times of copies of the content exceeds the permitted number of times of copies.

In this manner, the control unit 240 can change a priority, based on the number of times of copies of the content in other wireless communication devices. For example, when the number of times of copies is large relative to the threshold value, it is possible to perform a change of lowering the priority.

"Example in Which a Setting For a Service is Performed by Users Operation"

The user of the first wireless communication device 200 can perform a setting for the service by user's operation. For example, it is possible to set whether or not to actively cache a service to the first wireless communication device 200. Further, it is possible to set whether or not to actively use the first wireless communication device 200 as a relay node. That is, it is possible to set whether or not to generate a content reception event to the first wireless communication device 200. In the following, each of these settings will be described.

"Display Example of a Setting Screen For Performing a Setting For a Service"

Figure 17:
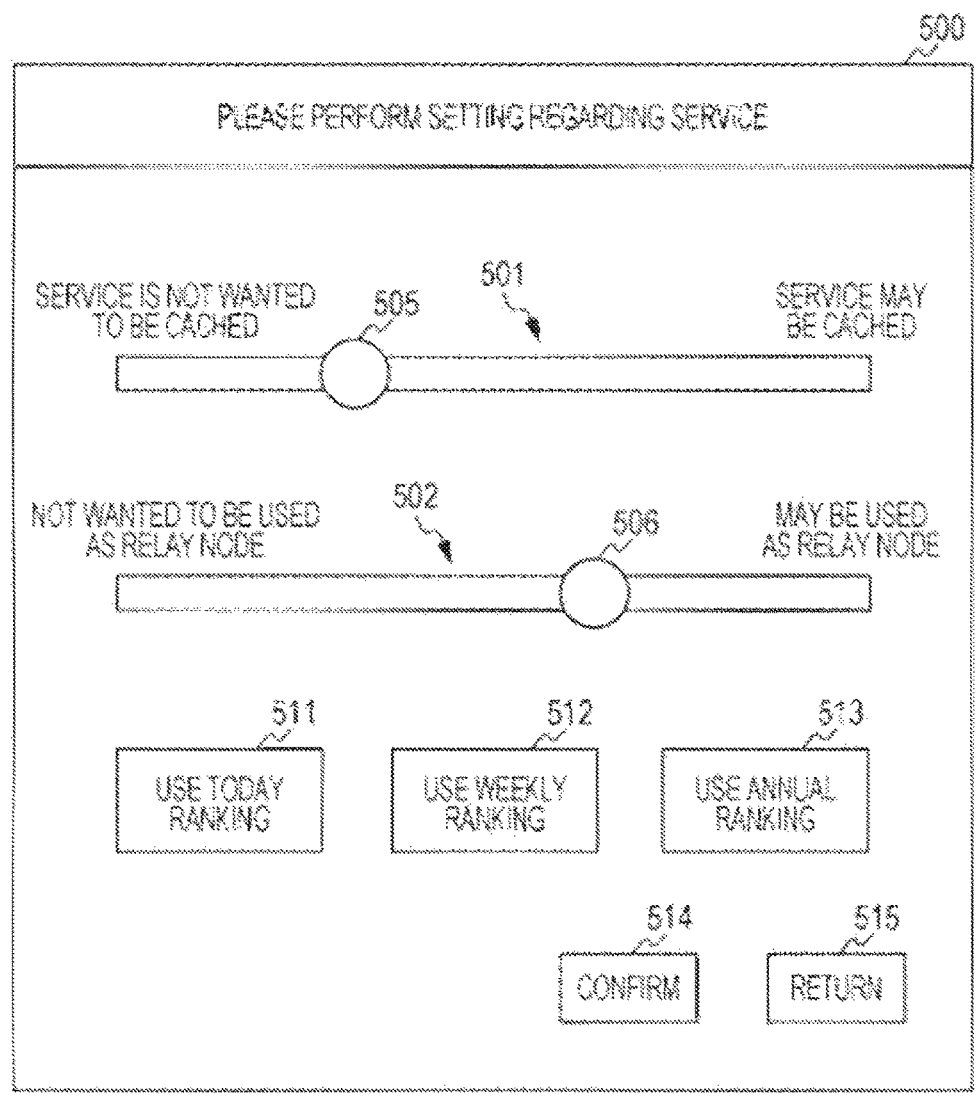
FIG. 17 is a diagram illustrating an example of a display screen (setting screen) displayed on a display unit in the first embodiment of the present technology.

FIG. 17 is a diagram illustrating an example of a display screen (setting screen 500) displayed on a display unit 280 in the first embodiment of the present technology. FIG. 17 illustrates an example in which each operation is performed using a touch panel in the setting screen 500.

The setting screen 500 is a display screen for performing a setting for a service. A first setting area 501, a second setting area 502, use ranking selection buttons 511 to 513, a confirm button 514 and a return button 515 are displayed in the setting screen 500.

The first setting area 501 is an area for setting whether or not to cache a service. For example, the user can set whether or not to cache a service (further, setting of the degree) by moving an operation indicator 505 in the first setting area 501.

The second setting area 502 is an area for setting whether or not to use the first wireless communication device 200 as the relay node. For example, the user can set whether or not to use the device as the relay node (further, setting of the degree) by moving an operation indicator 506 in the second setting area 502.

The use ranking selection buttons 511 to 513 are buttons to be pressed when selecting ranking information used in a case of determining whether or not to register in each table. In addition, the use ranking selection buttons 511 to 513 correspond to the today ranking 188, the weekly ranking 189, and the annual ranking 190 that are illustrated in FIG. 7.

The confirm, button 514 is a button to be pressed when confirming the setting content operated by the user.

The return button 515 is a button to be pressed when returning a screen to the screen that was displayed immediately before.

"Example of Setting Whether or Not to Cache a Service"

For example, it is possible to bias the determination of a content reception event, according to a location in the first setting area 501 of the operation indicator 505 which is moved by a user's operation (command that, is specified by the user). For example, when the operation that the user wants to actively cache a service is performed (that is, when the operation indicator 505 is moved to the right on the first setting area 501), a control of setting a large memory space as an application of long-term storing contents is performed.

"Example of Setting Whether or Not to Use as a Relay Node"

For example, it is possible to set whether or not to use as the relay node, according to a location in the second setting area 502 of the operation indicator 506 which is moved by a user's operation (command that is specified by the user). For example, according to a position of the operation indicator 506 in the second setting area 502, it is possible to adjust a parameter for determining whether the first wireless communication device 200 is suitable for being used as the relay station, and to bias a metric value used in selecting a route. For example, it is assumed a case where an operation indicating that the user is reluctant to generate a content reception event is performed (that is, a case where the operation indicator 506 is moved to the left on the second setting area 502). In this case, a control such as adjusting the metric value of a path through the first wireless communication device 200 in a worsening direction is performed.

Specifically, "parameter indicating whether to he suitable for being used as a relay Station" is reflected on the metric value based on the following equation 1.

$$M1 = M0 \times (\text{alpha} + \text{beta}/(100-P)) \qquad \text{Equation 1}$$

Where, M1 indicates a metric value after modification and M0 indicates a metric value before modification. In addition, M1 and M0 are evaluated as an excellent route as the value is small.

Farther, P is the "parameter indicating whether to be suitable for being used as a relay station" that is represented by a number between 0 and 99, and the parameter is determined depending on a position of the operation indicator 506 in the second setting area 502. For example, it is shown that it is intended to actively become a relay station, as the value of P is large.

Further, alpha and beta are parameters that control how strongly a bias is applied to the metric value of the wireless link, and are quasi-constant values that are set by the system operator and the like.

For example, it is assumed a case where an operation indicating being used as the relay station is not completely preferable (that is, a case where the operation indicator 506 is moved to the left on the second setting area 502). That is, it is assumed that 0 is input as P of equation 1 (a case where P=0 is input).

In this case, the first wireless communication device 200 sets a mode in which the own node is not become the relay node, and notifies (announces) to the neighboring node that the first wireless communication device 200 is in a state of not performing a relaying. If this mode is set, the first wireless communication device 200 does not perform the interpretation of control, packets .for a transfer process and a .route selection, even if packets addressed to other wireless communication devices is received. Thus, by deteriorating the metric value of the route for relaying the first wireless communication device 200, it is possible to perform a control of preferentially selecting a route using other wireless communication devices. Further, in IEEE802.11s standard, it is possible to set and announce the mode in which the own node is not the relay node.

In this manner, the control unit 240 can change a condition when determining whether to store the received content to the memory 300, based on the setting content that is set by the user's operation.

Further, FIG. 17 illustrates an example of setting each item using an operation area of a lever type, but for example, each item may be set using other operation methods. For example, each item may be set by inputting a number (for example, each item may be set by inputting P (0 to 99) of equation 1).

"Example is Which Service Discovery Information is Converted By a Hash Function and Transmitted"

In the above, an example in which the service discovery information (the own device service information 15 and other device service information 158 illustrated in FIG. 5A and FIG. 5B) is transmitted in a clear text as it is. However, it is also possible to convert the service discovery information to a different bit sequence by a hash function. In some cases, conversion by the hash function is for the purpose of information compression.

For example, by transmitting the service discovery information that has been converted by the hash function, only the wireless communication device that knows the hash function used in the conversion can interpret the service discovery information. Thus, it is possible to notify only limited wireless communication device with service discovery information. Incidentally, the following shows an example in which the service discovery information is converted by the hash function to be transmitted.

Figure 18:
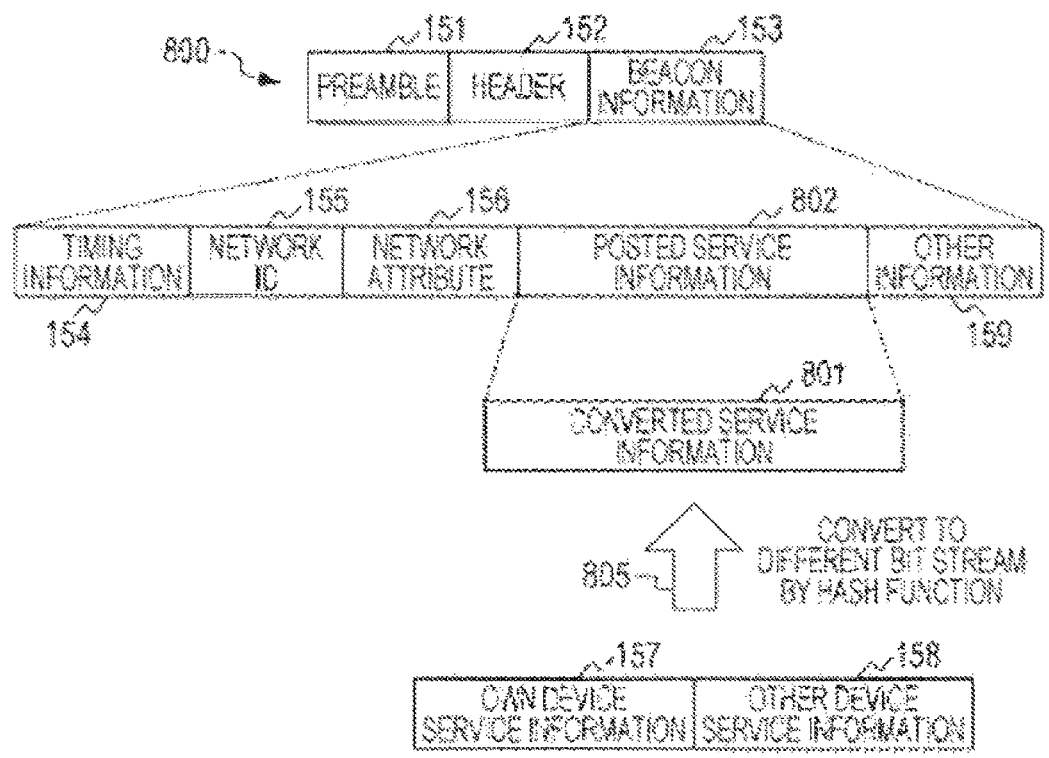
FIG. 18 is a diagram illustrating an example of a format of a beacon that each wireless communication device constituting the communication system transmits in the first embodiment of the present technology.

FIG. 18 is a diagram illustrating an example of a format of a beacon that each wireless communication device constituting the communication system 100 transmits in the first embodiment of the present technology. In addition, the example of the format illustrated in FIG. 18 is a format to which the example of the format illustrated in FIG. 5A and FIG. 5B is converted. Thus, in FIG. 18, the same parts as those of FIG. 5A and FIG. 5B are denoted as the same reference numerals, and the description thereof will be omitted.

For example, as shown by the arrow 805, the control unit 240 converts the own device service information 157 and other device service information 158 to a different bit stream by a hash function. Then, the control unit 240 causes information to which the own device service information 157 and other device service information 158 are converted (the converted service information 801) to be contained in a beacon 800 as service information 802 and transmits the beacon 800 to other wireless communication devices.

Here, when performing a service that distributes a content in Peer to Peer (P2P), there is a possibility that the service discovery information becomes extremely large. In contrast, in embodiments of the present technology, in the communication system 100 that exchanges service discovery information with an adjacent device to each other and distributes the content, it is possible to appropriately process service discovery information based on ranking information (priority), and the like. That is, it is possible to realize a P2P service that processes service discovery information based on the ranking information and the like. Accordingly, it is possible to appropriately make service discovery information compact and to distribute it. Further, when performing a service, it is possible to appropriately perform controls of which content each wireless communication device stores or how service discovery information is notified to peripheral devices.

Further, in the embodiment of the present technology, even in a wireless communication device that does not hold content, it is possible to cache the content and to resource the content. That is, in the communication system 100 that exchanges service discovery information with an adjacent device to each other and distributes the content, the wireless communication device that has cached the downloaded or relayed content can become a new content source. In other words, it is possible to realize a P2P service in which a relay station caches content. Further, it is possible to determine whether or not to cache using ranking information and the like, and to specify a wide range of contents to be cached. Accordingly, it is possible to provide a wide range of useful contents.

In this manner, in the embodiments of the present technology, it is possible to efficiently utilize a neighboring wireless communication device when receiving a service to be provided, and to realize an optimal network configuration. That is, it is possible to efficiently perform wireless communication performed between a plurality of wireless communication devices.

Note that the aforementioned embodiments of the present technology illustrate examples for realizing the present technology, and the matters in the embodiments and the present technology subject matters in the claims have corresponding relationships, respectively. Similarly, the technology subject matters in the claims, and matters in the embodiments of the present technology denoted by the same names have corresponding relationship, respectively. However, the present technology is not restricted to the embodiments, but can be realized by implementing the embodiments to various modifications without departing from the essence of the present technology.

Also, the processing procedures described in the embodiments of the present technology may be taken as a method having these series of procedures, or may be taken as a program causing a computer to execute these series of procedures through a recording medium for recording the program thereof. As for this recording medium, for example, Compact Disc (CD), MiniDisc (MD), Digital Versatile Disc (DVD), memory cards, Blu-ray Disc (registered trademark), or the like may be employed.

In addition, the present technology can take following configurations.

(1) An information processing device including:
circuitry configured to
acquire service information for a service from a first information processing apparatus,
change a priority of the service based on a status of the information processing device or a status of the service, and
provide the service information to a second information processing apparatus based on the priority.

(2) The information processing device according to (1), wherein the first information processing apparatus and the second information processing apparatus are a same information processing apparatus.

(3) The information processing device according to (1), wherein the first information processing apparatus and the second information processing apparatus are different information processing apparatuses.

(4) The information processing device according to (1) to (3), wherein the circuitry acquires the service information which includes service discovery information of the service available from the first information processing apparatus.

(5) The information processing device according to (1) to (4), wherein the circuitry provides the service information to the second information processing apparatus based on the priority by transmitting the service information in a beacon.

(6) The information processing device according to (5), wherein the circuitry repeatedly transmits the service information in a beacon at a periodic interval.

(7) The information processing device according to (6), wherein the circuitry changes the periodic interval at which the beacon is transmitted based on the priority of the service information.

(8) The information processing device according to (1) to (7), wherein, the circuitry stores the service information in information storage circuitry based on the priority of the service information.

(9) The information processing device according to (8), wherein the circuitry stores the service information in the information storage circuitry if the priority of the service information exceeds apriority of service information already stored in the information storage circuitry.

(10) The information processing device according to (1) to (9), wherein the circuitry acquires service information from a plurality of information processing apparatuses in a mesh network.

(11) The information processing device according to (5), wherein the circuitry transmits service discovery information for a service provided by the information processing device in the beacon.

(12) The information processing device according to (1) to (11), wherein the circuitry changes the priority of the service based on the status of the information processing device including at least one of: a number of contents stored by the information processing device, a number of other information processing apparatuses that can communicate with the information processing device, and a congestion degree of a communication line of the information processing device.

(13) The information processing device according to (1) to (12), wherein the circuitry changes the priority of the service based the status of the information processing device including whether or not narrowband signals can be transmitted by the information processing device.

(14) The information processing device according to (1) to (13), wherein the circuitry changes the priority of the service based on the status of the information processing device including movement of the information processing device.

(15) The information processing device according to (1) to (14), wherein the circuitry changes the priority of the service based on the status of the information processing device including whether or not long term service is possible based on an estimated remaining battery time for the information processing device.

(16) The information processing device according to (1) to (15), wherein the circuitry changes the priority of the service based on the status of the service including a cache recommendation of the service.

(17) The information processing device according to (1) to (16), wherein the circuitry changes the priority of the service based on the status of the service including a clone order of the service.

(18) A method including:
acquiring service information for a service from a first information processing apparatus;
changing a priority of the service based on a status of the information processing apparatus or a status of the service; and
providing the service information to a second information processing apparatus based on the priority.

(19) A non-transitory computer readable medium encoded with computer readable instructions that, when performed by a processor, cause the processor to perform the method according to (18).

(20) An information processing apparatus including:
a receiver configured to acquire service information for a service from a first information processing apparatus;
a priority determination circuit configured to change a priority of the service based on a status of the information processing apparatus or a status of the service; and
a transmitter configured to provide the service information to a second information processing apparatus based on the priority.

In addition, the present technology can take following configurations.

(1) A wireless communication device including: a communication unit that performs transmission and reception of service discovery information for notifying a service, provided by at least one of the wireless communication device and other wireless communication devices and containing a priority of services with other wireless communication devices present in a predetermined range using wireless communication; and a control unit that performs a control for changing the priority contained in the service discovery information transmitted to the other wireless communication devices, based on at least one of a use environment of the wireless communication device and a communication status of the wireless communication.

(2) The wireless communication device according to (1), in which the control unit determines whether or not to register a service corresponding to the service discovery information, based on the priority contained in the service discovery information received from the other wireless communication devices.

(3) The wireless communication device according to (2), in which the control unit causes the changed priority to be contained in the service discovery information relating to the registered service and transmits the service discovery information to the other wireless communication devices.

(4) The wireless communication device according to (2) or (3), in which the control unit sets a priority of the registered service based on ranking information indicating an evaluation of contents that provide the service.

(5) The wireless communication device according to (4), in which the control unit transmits to the other wireless communication devices, the service discovery information containing recommendation information for recommending the other wireless communication devices to store contents of which the ranking information is large relative to a threshold value.

(6) The wireless communication device according to any one of (1) to (5), in which the control unit changes the number of transmissions of the service discovery information to the other wireless communication devices based on the priority contained in the service discovery information.

(7) The wireless communication device according to any one of (1) to (6), in which the control unit changes the priority by using as a use environment of the wireless communication device, at least one of a hold state of contents, the number of other wireless communication devices capable of communicating using the wireless communication, movement status of the wireless communication device, and a period of providing the service.

(8) The wireless communication device according to any one of (1) to (7), in which the control unit changes the priority based on the number of times of copies of contents that provide the service in the other wireless communication devices.

(9) The wireless communication device according to (8), in which when the number of times of copies is larger relative to the threshold value, the control unit performs a change of lowering the priority.

(10) The wireless communication device according to any one of (1) to (9), in which the control unit transmits the service discovery information containing limit information for limiting the number of transmissions to the other wireless communication devices.

(11) A communication system including: a first wireless communication device that performs transmission and reception of service discovery information for notifying a service provided by at least one of the wireless communication device and other wireless communication devices and containing a priority of services with a second wireless communication device present in a predetermined range using wireless communication; and the second wireless communication device that performs a control for changing the priority contained in the service discovery information transmitted to the other wireless communication devices, based on at least one of a use environment of the second wireless communication device and a communication status of the second wireless communication.

(12) A control method of a wireless communication device, including: performing transmission and reception of service discovery information for notifying a service provided by at least one of the wireless communication device and other wireless communication devices and containing a priority of services with other wireless communication devices present in a predetermined range using wireless communication; and performing a control for changing the priority contained in the service discovery information transmitted to the other wireless communication devices, based on at least one of a use environment of the wireless communication device and a communication status of the wireless communication.

(13) A program causing a computer to execute: performing transmission and reception of service discovery information for notifying a service provided by at least one of the wireless communication device and other wireless communication devices and containing a priority of services with other wireless communication devices present in a predetermined range using wireless communication; and performing a control for changing the priority contained in the service discovery information transmitted to the other wireless communication devices, based on at least one of a use environment of the wireless communication device and a communication status of the wireless communication.

The present disclosure contains subject matter related to that disclosed in Japanese Priority Patent Application JP 2012-282306 filed in the Japan Patent Office on Dec. 26, 2012, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST 100 communication system
102 second wireless communication device
103 third wireless communication device
104 fourth wireless communication device
103 fifth wireless communication device
106 sixth wireless communication device
107 seventh wireless communication device
108 eighth wireless communication device
109 ninth wireless communication device
110 tenth wireless communication device
111 eleventh wireless communication device
112 twelfth wireless communication device
113 thirteenth wireless communication device
200 first wireless communication device
210 antenna
220 communication unit
230 I/O interlace
240 control unit
250 bus
260 movement detection unit
270 operation receiving unit
280 display unit
290 audio output unit
300 memory

The invention claimed is:

1. An information processing device, comprising:
communication circuitry configured to communicate with a plurality of information processing apparatuses; and
one or more processors coupled to a memory,
wherein the one or more processors are configured to:
acquire service information for a first service from a first information processing apparatus;
change a first priority of the first service based on capability of the plurality of information processing apparatuses to communicate with the information processing device; and
transmit the service information to a second information processing apparatus based on the changed first priority.

2. The information processing device according to claim 1, wherein a first type of the first information processing apparatus is same as a second type of the second information processing apparatus.

3. The information processing device according to claim 1, wherein a first type of the first information processing apparatus is different from a second type of the second information processing apparatus.

4. The information processing device according to claim 1, wherein the one or more processors are further configured to acquire the service information which includes service discovery information of the first service available from the first information processing apparatus.

5. The information processing device according to claim 1, wherein the one or more processors are further configured to transmit, based on the changed first priority, the service information to the second information processing apparatus in a beacon.

6. The information processing device according to claim 5, wherein the one or more processors are further configured to repeatedly transmit the service information in the beacon at a periodic interval.

7. The information processing device according to claim 6, wherein the one or more processors are further configured to change, based on a second priority associated with the service information, the periodic interval at which the beacon is transmitted.

8. The information processing device according to claim 1, wherein the one or more processors are further configured to store the service information in the memory based on a second priority associated with the service information.

9. The information processing device according to claim 8, wherein the one or more processors are further configured to store the service information in the memory based on a determination that the second priority exceeds a third priority of the service information that is stored in the memory.

10. The information processing device according to claim 1, wherein the one or more processors are further configured to acquire the service information from the plurality of information processing apparatuses in a mesh network.

11. The information processing device according to claim 5, wherein the one or more processors are further configured to transmit service discovery information for a second service provided by the information processing device in the beacon.

12. The information processing device according to claim 1, wherein the one or more processors are further configured to change the first priority of the first service, based on a status of the information processing device including at least one of a number of contents stored by the information processing device or a congestion degree of a communication line of the information processing device.

13. The information processing device according to claim 1, wherein the one or more processers are further configured to change the first priority of the first service based on a status of the information processing device that corresponds to transmission of narrowband signals by the information processing device.

14. The information processing device according to claim 1, wherein the one or more processers are further configured to change the first priority of the first service based on a status of the information processing device which corresponds to movement of the information processing device.

15. The information processing device according to claim 1, wherein the one or more processers are further configured to:
determine, based on an estimated battery time that is available for the information processing device, a status of the information processing device to indicate that a long term service is possible; and
change the first priority of the first service based on the determined status of the information processing device.

16. The information processing device according to claim 1, wherein the one or more processers are further configured to change the first priority of the first service based on a status of the first service which includes a cache recommendation of the first service.

17. The information processing device according to claim 1, wherein the one or more processers are further configured to change the first priority of the first service based on a status of the first service which includes a clone order of the first service.

18. A method, comprising:
in an information processing device:
acquiring service information for a service from a first information processing apparatus;
changing a priority of the service based on a capability of a plurality of information processing apparatuses to communicate with the information processing device that acquires the service information; and
transmitting the service information to a second information processing apparatus based on the priority.

19. A non-transitory computer-readable medium having stored thereon, computer executable instructions that causes the computer to execute operations, the operations comprising:
acquiring service information for a service from a first information processing apparatus;
changing a priority of the service based on a capability of a plurality of information processing apparatuses to communicate with an information processing device that acquires the service information; and
transmitting the service information to a second information processing apparatus based on the priority.

20. A first information processing apparatus, comprising:
a receiver configured to acquire service information for a service from a second information processing apparatus;
a priority determination circuit configured to change a priority of the service based on a capability of a plurality of information processing apparatuses to communicate with the first information processing apparatus; and
a transmitter configured to transmit the service information to a third information processing apparatus based on the priority.

21. An information processing device, comprising:
one or more processors coupled to a memory, the one or more processors are configured to:
acquire service information for a service from a first information processing apparatus;
change a priority of the service based on at least a status of the information processing device or a status of the service;
provide the service information to a second information processing apparatus based on the priority,
wherein the service information is provided by transmission of the service information in a beacon;
repeatedly transmit the service information in the beacon at a periodic interval; and
change the periodic interval at which the beacon is transmitted based on the priority of the service information.

* * * * *